United States Patent
Tour et al.

(10) Patent No.: US 9,604,849 B2
(45) Date of Patent: Mar. 28, 2017

(54) NUCLEOPHILIC POROUS CARBON MATERIALS FOR CO2 AND H2S CAPTURE

(71) Applicants: James M. Tour, Bellaire, TX (US); Chih-Chau Hwang, Houston, TX (US); Desmond E. Schipper, Houston, TX (US)

(72) Inventors: James M. Tour, Bellaire, TX (US); Chih-Chau Hwang, Houston, TX (US); Desmond E. Schipper, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 0 days.

(21) Appl. No.: 14/458,993

(22) Filed: Aug. 13, 2014

(65) Prior Publication Data
US 2015/0111024 A1   Apr. 23, 2015

Related U.S. Application Data

(60) Provisional application No. 61/865,296, filed on Aug. 13, 2013.

(51) Int. Cl.
*B01D 53/02*   (2006.01)
*C01B 31/12*   (2006.01)
(Continued)

(52) U.S. Cl.
CPC ............ *C01B 31/12* (2013.01); *B01D 53/047* (2013.01); *B01D 53/526* (2013.01); *B01D 53/82* (2013.01);
(Continued)

(58) Field of Classification Search
CPC .... B01D 53/047; B01D 53/526; B01D 53/82; B01J 20/02; B01J 20/0285; B01J 20/06;
(Continued)

(56) References Cited

U.S. PATENT DOCUMENTS

| | | |
|---|---|---|
| 4,082,694 A | 4/1978 | Wennerberg et al. |
| 4,504,287 A | 3/1985 | Atlani et al. |

(Continued)

FOREIGN PATENT DOCUMENTS

| | | |
|---|---|---|
| WO | WO-2012026755 A2 | 3/2012 |
| WO | WO-2012158194 A1 | 11/2012 |

(Continued)

OTHER PUBLICATIONS

Alvarez et al., Greater focus needed on methane leakage from natural gas infrastructure. Proc. Natl. Acad. Sci. USA 109, 6435-6440 (2012).

(Continued)

*Primary Examiner* — Christopher P Jones
(74) *Attorney, Agent, or Firm* — Winstead PC

(57) ABSTRACT

In some embodiments, the present disclosure pertains to methods of capturing a gas from an environment by associating the environment (e.g., a pressurized environment) with a porous carbon material that comprises a plurality of pores and a plurality of nucleophilic moieties. In some embodiments, the associating results in sorption of gas components (e.g., $CO_2$ or $H_2S$) to the porous carbon materials. In some embodiments, the methods of the present disclosure also include a step of releasing captured gas components from porous carbon materials. In some embodiments, the releasing occurs without any heating steps by decreasing environmental pressure. In some embodiments, the methods of the present disclosure also include a step of disposing released gas components and reusing porous carbon materials. Additional embodiments of the present disclosure pertain to porous carbon materials that are used for gas capture.

42 Claims, 15 Drawing Sheets

(51) Int. Cl.
| | |
|---|---|
| *B01D 53/047* | (2006.01) |
| *B01J 20/28* | (2006.01) |
| *B01J 20/22* | (2006.01) |
| *B01J 20/02* | (2006.01) |
| *B01D 53/52* | (2006.01) |
| *B01D 53/82* | (2006.01) |
| *C10L 3/10* | (2006.01) |
| *B01J 20/06* | (2006.01) |
| *B01J 20/08* | (2006.01) |
| *B01J 20/10* | (2006.01) |
| *B01J 20/20* | (2006.01) |
| *B01J 20/32* | (2006.01) |

(52) U.S. Cl.
CPC ........... *B01J 20/02* (2013.01); *B01J 20/0285* (2013.01); *B01J 20/06* (2013.01); *B01J 20/08* (2013.01); *B01J 20/103* (2013.01); *B01J 20/20* (2013.01); *B01J 20/22* (2013.01); *B01J 20/28066* (2013.01); *B01J 20/28076* (2013.01); *B01J 20/28078* (2013.01); *B01J 20/3204* (2013.01); *B01J 20/3236* (2013.01); *B01J 20/3246* (2013.01); *C10L 3/102* (2013.01); *C10L 3/104* (2013.01); *Y02C 10/08* (2013.01); *Y02P 20/152* (2015.11); *Y10T 428/249967* (2015.04)

(58) Field of Classification Search
CPC . B01J 20/08; B01J 20/103; B01J 20/20; B01J 20/22; B01J 20/28066; B01J 20/28076; B01J 20/28078; B01J 20/3204; B01J 20/3236; B01J 20/3246; C01B 31/12; C10L 3/102; C10L 3/104; Y02C 10/08; Y02P 20/152; Y10T 428/249967
See application file for complete search history.

(56) References Cited

U.S. PATENT DOCUMENTS

| | | | |
|---|---|---|---|
| 4,889,541 A * | 12/1989 | Beaupre | B01D 53/22 95/46 |
| 5,494,869 A * | 2/1996 | Hayden | B01D 53/8612 423/230 |
| 5,599,445 A * | 2/1997 | Betz | B01D 15/08 210/198.2 |
| 5,704,967 A * | 1/1998 | Tom | B01D 53/0407 96/143 |
| 5,972,834 A | 10/1999 | Ohsaki et al. | |
| 6,547,854 B1 | 4/2003 | Gray et al. | |
| 6,585,948 B1 | 7/2003 | Ryoo et al. | |
| 6,592,764 B1 | 7/2003 | Stucky et al. | |
| 6,762,330 B2 * | 7/2004 | Li | B01J 31/1875 564/337 |
| 6,908,497 B1 * | 6/2005 | Sirwardane | B01D 53/02 423/230 |
| 8,114,372 B2 | 2/2012 | Pak et al. | |
| 8,133,305 B2 | 3/2012 | Lackner et al. | |
| 8,277,767 B2 | 10/2012 | Ariya-Far | |
| 8,636,830 B2 | 1/2014 | Barron et al. | |
| 9,034,085 B2 | 5/2015 | Barron et al. | |
| 2003/0221555 A1 | 12/2003 | Golden et al. | |
| 2004/0045434 A1 | 3/2004 | Golden et al. | |
| 2008/0210901 A1 | 9/2008 | Giannantonio et al. | |
| 2008/0264254 A1 | 10/2008 | Song et al. | |
| 2008/0276804 A1 | 11/2008 | Sayari et al. | |
| 2009/0038632 A1 | 2/2009 | Cashmore et al. | |
| 2009/0169452 A1 | 7/2009 | Constantz et al. | |
| 2010/0029466 A1 | 2/2010 | Woodhouse | |
| 2010/0061904 A1 | 3/2010 | Lund et al. | |
| 2010/0062926 A1 | 3/2010 | Woodhouse et al. | |
| 2010/0139536 A1 | 6/2010 | Woodhouse et al. | |
| 2010/0140175 A1 * | 6/2010 | Wyse | B01D 15/00 210/660 |
| 2010/0154636 A1 | 6/2010 | Liu et al. | |
| 2010/0155335 A1 | 6/2010 | Taboada-Serrano et al. | |
| 2010/0212495 A1 | 8/2010 | Gadkaree et al. | |
| 2011/0005390 A1 | 1/2011 | Haugan | |
| 2011/0005392 A1 | 1/2011 | Pirngruber et al. | |
| 2011/0059000 A1 | 3/2011 | Constantz et al. | |
| 2011/0088553 A1 | 4/2011 | Woodhouse et al. | |
| 2011/0150730 A1 | 6/2011 | Baugh et al. | |
| 2011/0168018 A1 * | 7/2011 | Mohamadalizadeh | B01D 53/02 95/136 |
| 2011/0172084 A1 | 7/2011 | Jang et al. | |
| 2011/0172412 A1 | 7/2011 | Serre et al. | |
| 2011/0174507 A1 | 7/2011 | Burnham et al. | |
| 2011/0179948 A1 | 7/2011 | Choi et al. | |
| 2011/0230334 A1 | 9/2011 | Goldberg et al. | |
| 2011/0308389 A1 | 12/2011 | Graff et al. | |
| 2012/0024153 A1 | 2/2012 | Barron et al. | |
| 2012/0048111 A1 | 3/2012 | Nakao et al. | |
| 2012/0063979 A1 * | 3/2012 | Kortunov | B01D 53/1475 423/228 |
| 2012/0125196 A1 | 5/2012 | Woodhouse et al. | |
| 2012/0258853 A1 * | 10/2012 | Veeraraghavan | C09C 1/56 502/62 |
| 2012/0308456 A1 | 12/2012 | Leta et al. | |
| 2013/0287662 A1 * | 10/2013 | Chuang | B01D 53/02 423/228 |
| 2014/0076158 A1 | 3/2014 | Tour et al. | |
| 2014/0103255 A1 | 4/2014 | Barron et al. | |
| 2015/0024931 A1 | 1/2015 | Tour et al. | |
| 2015/0056116 A1 | 2/2015 | Tour et al. | |
| 2015/0111018 A1 | 4/2015 | Tour et al. | |
| 2016/0001260 A1 | 1/2016 | Tour et al. | |
| 2016/0136613 A1 | 5/2016 | Tour et al. | |

FOREIGN PATENT DOCUMENTS

| | | |
|---|---|---|
| WO | WO-2013106712 A1 | 7/2013 |
| WO | WO-2014210295 A3 | 2/2015 |

OTHER PUBLICATIONS

Puxty et al. Carbon dioxide postcombustion capture: A novel screening study of the carbon dioxide absorption performance of 76 amines. Environ. Sci. Technol. 43, 6427-6433 (2009).
Siriwardane et al., Adsorption of CO2 on molecular sieves and activated carbon. Energy Fuels 15, 279-284 (2001).
Li et al., Porous materials with pre-designed single-molecule traps for CO2 selective adsorption. Nat. Commun. 4, 1538-1545 (2013).
Guo et al., Adsorption of carbon dioxide on activated carbon. J. Natural Gas Chem. 15, 223-229 (2006).
D'Alessandro et al., Carbon dioxide capture: Prospects for new materials, Angew. Chem. Int. Ed. 49, 6058-602 (2010).
Y. Wan, "Host?Guest" Chemistry in the Synthesis of Ordered Nonsiliceous Mesoporous Materials, Acc. Chem. Res., 2006, 39, 423.
Rivera-Utrilla et al., Activated carbon modifications to enhance its water treatment applications, An overview, J. Hazard. Mater. 2011, 187, 1-23.
Shen et al., Nitrogen-containing porous carbons: synthesis and application, J. Mater. Chem. A 2013, 1, 999.
Hwang et al., In situ Synthesis of Polymer-Modified Mesoporous Carbon CMK-3 Composites for CO2 Sequestration, ACS Appl. Mater. Interfaces 2011, 3, 4782.
Golombok et al., Assessing contaminated gas, Hart's E & P Mag. Jun. 73-75, 2008.
Yong et al., Adsorption of carbon dioxide on chemically modified high surface area carbon-based adsorbents at high temperature. Adsorption 7, 41-50 (2001).
Xie et al., Capture and conversion of CO2 at ambient conditions by a conjugated microporous polymer. Nat. Commun. 4, 1960-1966 (2013).
Xia et al., Preparation of sulfur-doped microporous carbons for the storage of hydrogen and carbon dioxide. Carbon 50, 5543-5553 (2012).

(56) References Cited

OTHER PUBLICATIONS

Sankaran et al., The role of heteroatoms in carbon nanotubes for hydrogen storage. Carbon 44, 2816-2821 (2006).
Qajar et al., High pressure hydrogen adsorption apparatus: Design and error analysis. Int. J. Hydrogen Energy 37, 9123-9136 (2012).
Espinal et al., Measurement, standards, and data needs for CO2 capture materials: A critical review. Environ. Sci. Technol. 47, 11960-11975 (2013).
Wang et al., Increasing selective CO2 adsorption on amine-grafted SBA-15 by increasing silanol density. J. Phys. Chem. 115, 21264-21272 (2011).
Zhou et al., Comparative study of the excess versus absolute adsorption of CO2 on superactivated carbon for the near-critical region. Langmuir 19, 2683-2690 (2003).
Langer et al. Reversible CO2 fixation by iridium(I) complexes containing Me2PhP as ligand. Organometallics 29, 1642-1651 (2010).
Sevilla et al., Highly porous S-doped carbons. Microporous Mesoporous Mater. 158, 318-323 (2012).
Zhang et al., Enhancement of CO2 adsorption and CO2/N2 selectivity on ZIF-8 via postsynthetic modification. AIChE J. 59, 2195-2206 (2013).
Lee et al., Preferential Occupation of CO2 Molecules in Hydroquinone Clathrates Formed from CO2/N2 Gas Mixtures. J. Phys. Chem. C 115, 22647-22651 (2011).
Loring et al., In Situ Molecular Spectroscopic Evidence for CO2 Intercalation into Montmorillonite in Supercritical Carbon Dioxide. Langmuir 28, 7125-7128 (2012).
Comotti et al., Porous dipeptide crystals as selective CO2 adsorbents: experimental isotherms vs. grand canonical Monte Carlo simulations and MAS NMR spectroscopy. CrystEngComm 15, 1503-1507 (2013).
Bowers et al., In Situ 13C and 23Na Magic Angle Spinning NMR Investigation of Supercritical CO2 Incorporation in Smectite-Natural Organic Matter Composites. J. Phys. Chem. C 118, 3564-3573 (2014).
Heuchel et al., "Adsorption of Carbon Dioxide and Methane and Their Mixtures on an Activated Carbon: Simulation and Experiment", Langmuir, 1999,15, 8695-8705.
Fryxell et al., "Design and Synthesis of Selective Mesoporous Anion Traps", Chem. Mater. 1999, 11, 2148-2154.
Yoshitake et al.,"Adsorption of Chromate and Arsenate by Amino-Functionalized MCM-41 and SBA-1" Chem. Mater. 2002,14,4603-4610.
Xu et al., "Preparation and characterization of novel CO2 'molecular basket' adsorbents based on polymer-modified mesoporous molecular sieve MCM-41", Microporous Mesoporous Mater. 2003, 62, 29-45.
Caskey et al., "Dramatic Tuning of Carbon Dioxide Uptake via Metal Substitution in a Coordination Polymer with Cylindrical Pores", J. Am. Chem. Soc. 2008,130, 10870-10871.
McDonald et al., "Enhanced carbon dioxide capture upon incorporation of N,N-dimethylethylenediamine in the metal-organic framework CuBTTri" Chem. Sci. 2011, 2, 2022-2028.
Lee et al., "Synthesis of new nanoporous carbon materials using nanostructured silica materials as templates", J. Mater. Chem. 2004, 14, 478-486.
Ryoo et al., "Ordered Mesoporous Carbons", Adv. Mater. 2001, 13, 677-681.
Kyotani et al., "Control of pore structure in carbon", Carbon 2000, 38, 269-286.
Choi et al., "Ordered nanoporous polymer-carbon composites", Nature Mater. 2003, 2, 473-476.
Zhao et al., "Triblock Copolymer Syntheses of Mesoporous Silica with Periodic 50 to 300 Angstrom Pores", Science 1998, 279, 548-552.
Joo et al., "Ordered nanoporous arrays of carbon supporting high dispersions of platinum nanoparticles", Nature 2001, 412, 169-172.

Mello et al., "Amine-modified MCM-41 mesoporous silica for carbon dioxide capture" Micropor. Mesopor. Mater., 2011, 143, 174-179.
Xu et al., "Novel Polyethylenimine-Modified Mesoporous Molecular Sieve of MCM-41 Type as High-Capacity Adsorbent for CO2 Capture" Energy Fuels, 2002, 16,1463-1469.
Choi et al., "Adsorbent Materials for Carbon Dioxide Capture from Large Anthropogenic Point Sources" ChemSusChem, 2009, 2, 796-854.
Ma et al., "'Molecular Basket' Sorbents for Separation of CO2 and H2S from Various Gas Streams", J. Am. Chem. Soc., 2009, 131,5777-5783.
Dillon et al., "Synthesis, Characterization, and Carbon Dioxide Adsorption of Covalently Attached Polyethyleneimine-Functionalized Single-Wall Carbon Nanotubes", ACS Nano, 2008, 2, 156-164.
Jun et al., "Synthesis of New Nanoporous Carbon with Hexagonally Ordered Mesostructure", J. Am. Chem. Soc., 2000, 122, 10712-10713.
Chang et al., "In-Situ Infrared Study of CO2 Adsorption on SBA-15 Grafted with γ-Aminopropyltriethoxysilane", Energy Fuels, 2003, 17,468-473.
National Aeronautics and Space Administration brochure entitled "International Space Station Environmental Control and Life Support System." 2008.
Mishra et al., "Nanomagnetite decorated multiwalled carbon nanotubes: a robust nanomaterial for enhanced carbon dioxide adsorption", Energy and Environmental Sciences, 2011, 4, 889-895.
Huwe et al., "Iron (III) oxide nanoparticles with the pore system of mesoporous carbon CMK-1: intra-pore synthesis and characterization", Microporous and Mesoporous Materials 60 (2003) 151-158.
Iota et al., Quartzlike Carbon Dioxide: An Optically Nonlinear Extended Solid at High Pressures and Temperatures, *Science* 1999, 283, 1510.
Yoo et al., Crystal Structure of Carbon Dioxide at High Pressure: "Superhard" Polymeric Carbon Dioxide, C. Phys. Rev. Lett. 1999, 83, 5527.
Shen et al., Yeast-Based Microporous Carbon Materials for Carbon Dioxide Capture, ChemSusChem, 2012, 5: 1274-1279.
Seredych et al., Role of Microporosity and Nitrogen Functionality on the Surface of Activated Carbon in the Process of Desulfurization of Digester Gas, J. Phys. Chem. C, 2008, 112 (12), pp. 4704-4711.
Herzog et al., Peer Reviewed: What Future for Carbon Capture and Sequestration?, Environ. Sci. Technol. 2001, 35, 148A-153A.
Haszeldine et al., Carbon Capture and Storage: How Green Can Black Be?, Science 2009, 325, 1647-1652.
Aaron et al., Separation of CO2 from Flue Gas: A Review, Separation Science and Technology, 40, 321-348, 2005.
Rochelle et al., Amine Scrubbing for CO2 Capture, Science, 2009, 325, 1652-1654.
Yong et al., Adsorption of carbon dioxide at high temperature—a review, Separation Science and Technology, 2002, 26, 195-205.
Goetman et al., Chemical Synthesis of Mesoporous Carbon Nitrides Using Hard Templates and Their Use as a Metal-Free Catalyst for Friedel-Crafts Reaction of Benzene, Angew. Chem. Int. Ed. 2006, 45, 4467-4471.
Mao et al., Lithium storage in nitrogen-rich mesoporous carbon materials, Energy Environ. Sci. 2012, 5, 7950-7955.
Li et al., Mesoporous nitrogen-rich carbons derived from protein for ultra-high capacity battery anodes and supercapacitors, Energy Environ. Sci. 2013, 6, 871-87.
Wang et al., CO2 capture by solid adsorbents and their applications: current status and new trends , Energy Environ. Sci. 2011, 4, 42-55.
Llewellyn et al., High Uptakes of CO2 and CH4 in Mesoporous Metal-Organic Frameworks MIL-100 and MIL-101, Langmuir 2008, 24, 7245-7250.
Furukawa et al., Ultrahigh porosity in metal-organic frameworks, Science, 2010, 239, 424-428.
Yang et al., Progress in carbon dioxide separation and capture: a review,J. Environ. Sci. 2008, 20, 14-27.
Millward et al., Metal-Organic Frameworks with Exceptionally High Capacity for Storage of Carbon Dioxide at Room Temperature, J. Am. Chem. Soc. 2005, 127, 17998-17999.

\* cited by examiner

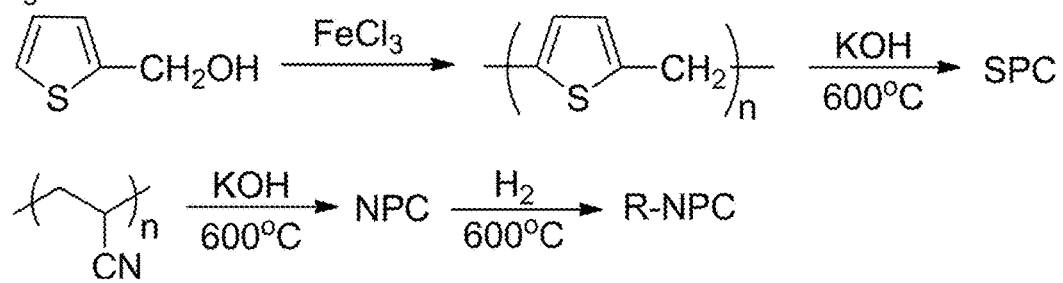
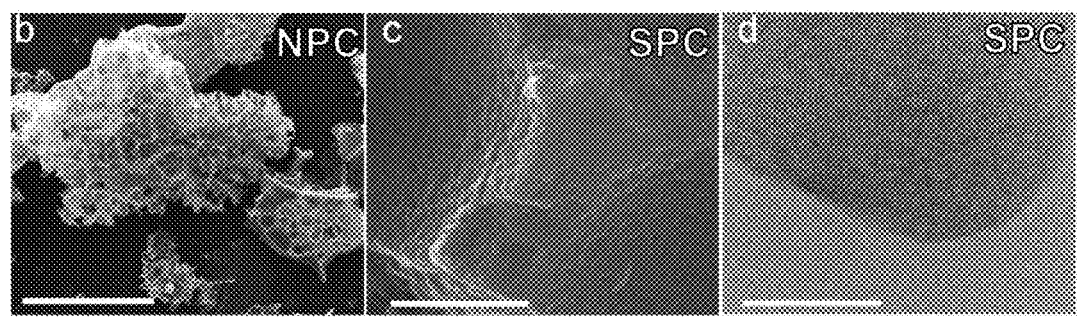
Fig. 2B  Fig. 2C  Fig. 2D
FIG. 2

NUCLEOPHILIC POROUS CARBON MATERIALS FOR CO2 AND H2S CAPTURE

CROSS-REFERENCE TO RELATED APPLICATIONS

This application claims priority to U.S. Provisional Patent Application No. 61/865,296, filed on Aug. 13, 2013. This application is also related to U.S. patent application Ser. No. 14/315,920, filed on Jun. 26, 2014. The entirety of each of the aforementioned applications is incorporated herein by reference.

STATEMENT REGARDING FEDERALLY SPONSORED RESEARCH

Not applicable.

BACKGROUND

Current methods and materials for capturing carbon dioxide ($CO_2$) and hydrogen sulfide ($H_2S$) from an environment suffer from numerous limitations, including low selectivity, limited sorption capacity, and stringent reaction conditions. The present disclosure addresses these limitations.

SUMMARY

In some embodiments, the present disclosure pertains to methods of capturing gas from an environment. In some embodiments, the methods comprise a step of associating the environment with a porous carbon material. In some embodiments, the porous carbon material comprises a plurality of pores and a plurality of nucleophilic moieties. In some embodiments, the associating results in sorption of the gas components to the porous carbon material. In some embodiments, the gas components include at least one of $CO_2$, $H_2S$ and combinations thereof.

The methods of the present disclosure may be utilized to capture $CO_2$ and $H_2S$ from various environments. In some embodiments, the environments include, without limitation, industrial gas streams, natural gas streams, natural gas wells, industrial gas wells, oil and gas fields, and combinations thereof. In some embodiments, the environment is a pressurized environment with a total pressure that is higher than atmospheric pressure (e.g., 5 bar to 500 bar).

In some embodiments, porous carbon materials are associated with an environment by placing the porous carbon materials at or near the environment. In some embodiments, porous carbon materials are associated with an environment by flowing the environment through a structure that contains the porous carbon materials.

In some embodiments, the sorption of gas components to the porous carbon materials occurs above atmospheric pressure (e.g., 5 bar to 500 bar). In some embodiments, the sorption of gas components to the porous carbon materials occurs at ambient temperature without any heating steps.

In some embodiments, the sorbed gas components include $CO_2$. In some embodiments, the sorption of the $CO_2$ to the porous carbon material occurs selectively over hydrocarbons in the environment. In some embodiments, the $CO_2$ is converted to poly($CO_2$) within the pores of the porous carbon materials. In some embodiments, the porous carbon material has a $CO_2$ sorption capacity of about 10 wt % to about 200 wt % of the porous carbon material weight.

In some embodiments, the sorbed gas components include $H_2S$. In some embodiments, the $H_2S$ is converted within the pores of the porous carbon materials to at least one of elemental sulfur (S), sulfur dioxide ($SO_2$), sulfuric acid ($H_2SO_4$), and combinations thereof. In some embodiments, the formed elemental sulfur becomes impregnated with the porous carbon material. In some embodiments, captured $H_2S$ remains intact within the porous carbon material. In some embodiments, the porous carbon material has a $H_2S$ sorption capacity of about 10 wt % to about 100 wt % of the porous carbon material weight.

In some embodiments, the sorbed gas components include $CO_2$ and $H_2S$. In some embodiments, the sorption of $H_2S$ and $CO_2$ to the porous carbon material occurs at the same time. In some embodiments, the sorption of $CO_2$ to the porous carbon material occurs before the sorption of $H_2S$ to the porous carbon material. In some embodiments, the sorption of $H_2S$ to the porous carbon material occurs before the sorption of $CO_2$ to the porous carbon material.

In some embodiments, the methods of the present disclosure also include a step of releasing captured gas components from the porous carbon material. In some embodiments, the releasing occurs by decreasing the pressure of the environment or heating the environment. In some embodiments where the sorbed gas components include $CO_2$ and $H_2S$, the releasing of the $CO_2$ occurs by decreasing the pressure of the environment or placing the porous carbon material in a second environment that has a lower pressure than the environment where $CO_2$ capture occurred. In some embodiments, the releasing of the $H_2S$ occurs by heating the porous carbon material. In some embodiments, the releasing of the $CO_2$ occurs before the releasing of the $H_2S$.

In some embodiments, the methods of the present disclosure also include a step of disposing the released gas. In some embodiments, the methods of the present disclosure also include a step of reusing the porous carbon material after the releasing to capture additional gas components from an environment.

The methods of the present disclosure can utilize various porous carbon materials for gas capture. Additional embodiments of the present disclosure pertain to such porous carbon materials for gas capture. Generally, such porous carbon materials comprise a plurality of pores and a plurality of nucleophilic moieties.

In some embodiments, the porous carbon materials include, without limitation, nucleophilic polymers, polypeptides, proteins, waste materials, carbohydrates, cotton, fat, nitrogen-containing porous carbon materials, sulfur-containing porous carbon materials, metal-containing porous carbon materials, metal oxide-containing porous carbon materials, metal sulfide-containing porous carbon materials, phosphorous-containing porous carbon materials, and combinations thereof. In some embodiments, the porous carbon materials include a nucleophilic polymer. In some embodiments, the nucleophilic polymer includes, without limitation, nitrogen-containing polymers, sulfur-containing polymers, polythiophene (PTH), polythiophene-methanol (also called 2-(hydroxymethyl)thiophene), polyacrylonitrile (PAN), polypyrrole, and combinations thereof. In some embodiments, the nucleophilic polymer is carbonized. In some embodiments the nucleophilic polymer is carbonized and reduced.

In some embodiments, the nucleophilic moieties are part of the porous carbon materials. In some embodiments, the nucleophilic moieties are embedded within the pores of the porous carbon materials. In some embodiments, the nucleophilic moieties include, without limitation, primary nucleophiles, secondary nucleophiles, tertiary nucleophiles and combinations thereof. In some embodiments, the nucleophilic moieties include, without limitation, oxygen-containing moieties, sulfur-containing moieties, metal-containing moieties, metal oxide-containing moieties, metal sulfide-containing moieties, phosphorous-containing moieties, nitrogen-containing moieties, and combinations thereof.

The porous carbon materials of the present disclosure may have various properties. For instance, in some embodiments, the porous carbon materials of the present disclosure have surface areas ranging from about 1,000 m$^2$/g to about 3,000 m$^2$/g. In some embodiments, the pores in the porous carbon materials have diameters ranging from about 5 nm to about 100 nm. In some embodiments, the pores in the porous carbon materials have volumes ranging from about 1 cm$^3$/g to about 10 cm$^3$/g. In some embodiments, the porous carbon materials have densities ranging from about 0.3 g/cm$^3$ to about 4 g/cm$^3$.

DESCRIPTION OF THE FIGURES

FIG. 2 provides synthetic schemes and micrographic images of various porous carbon materials. FIG. 2A provides a scheme for the synthesis of sulfur-containing porous carbon (SPC) or nitrogen containing porous carbon (NPC) by treating poly[(2-hydroxymethyl)thiophene] or poly(acrylonitrile) with KOH at 600° C. and then washing with dilute HCl and water until the extracts are neutral. The NPC is further reduced using 10 wt % $H_2$ at 600° C. to form reduced NPC(R-NPC). The synthetic details are described in Example 1. FIG. 2B provides a scanning electron microscopy (SEM) image of NPCs at a scale bar of 100 μm. FIG. 2C provides an SEM image of SPCs at a scale bar of 500 nm. FIG. 2D provides a transmission electron microscopy (TEM) image of the SPCs in FIG. 2B at a scale bar of 25 nm.

FIG. 4A provides volumetric and gravimetric uptake of $CO_2$ on SPC at different temperatures and pressures. Data designated with (*) were recorded volumetrically at Rice University. Data designated with (§) were performed volumetrically at the National Institute of Standards and Technology (NIST). Data designated with (+) were measured gravimetrically at NIST. All gravimetric measurements were corrected for buoyancy. FIGS. 4B-D provide three consecutive $CO_2$ sorption-desorption cycles on the SPC over a pressure range from 0 to 30 bar at 30° C. All solid circles indicate $CO_2$ sorption, while the open circles designate the desorption process. FIG. 4E provides volumetric SPC $CO_2$ sorption isotherms at 23° C. and 50° C. over a pressure range from 0 to 1 bar.

FIG. 5A is adapted from *Chem. Sci.* 5, 32-51 (2014). The blue dashed line indicates the Gibbs dividing surface. It divides the free volume into two regions in which gas molecules are either in an adsorbed or bulk state. FIG. 5B shows a depiction of total uptake, which can be used as an approximation for absolute uptake for microporous materials with negligible external surface areas.

FIGS. 7E-G show proposed mechanisms that illustrate the poly($CO_2$) formation in SPCs, NPCs, and R-NPCs respectively, in a higher pressure $CO_2$ environment. With the assistance of the nucleophile, such as S or N, the $CO_2$ polymerization reaction is initiated under pressure, and the polymer is further likely stabilized by the van der Waals interactions with the carbon surfaces in the pores.

FIG. 10A provides data relating to volumetric $CO_2$ uptake performance at 30° C. of SPC, NPC, R-NPC and the following traditional sorbents: activated carbon, ZIF-8, and zeolite 5A. Aluminum foil was used as a reference to ensure no $CO_2$ condensation was occurring in the system at this temperature and pressure. Volumetric $CO_2$ and $CH_4$ uptake tests at 23° C. on SPC (FIG. 10B), activated carbon (FIG. 10C) and ZIF-8 sorbents (FIG. 10D) are also shown.

FIG. 11A shows MS data that was taken while the system was being pressurized with a premixed gas of $CO_2$ in natural gas during the uptake process. FIG. 11B shows MS data that was recorded while the premixed gas-filled SPC was desorbing from 30 bar. The mixed gas was purchased from Applied Gas Inc.

FIG. 13 provides illustrations relating to the use of SPCs and NPCs for $H_2S$ capture.

DETAILED DESCRIPTION

Figure 1:
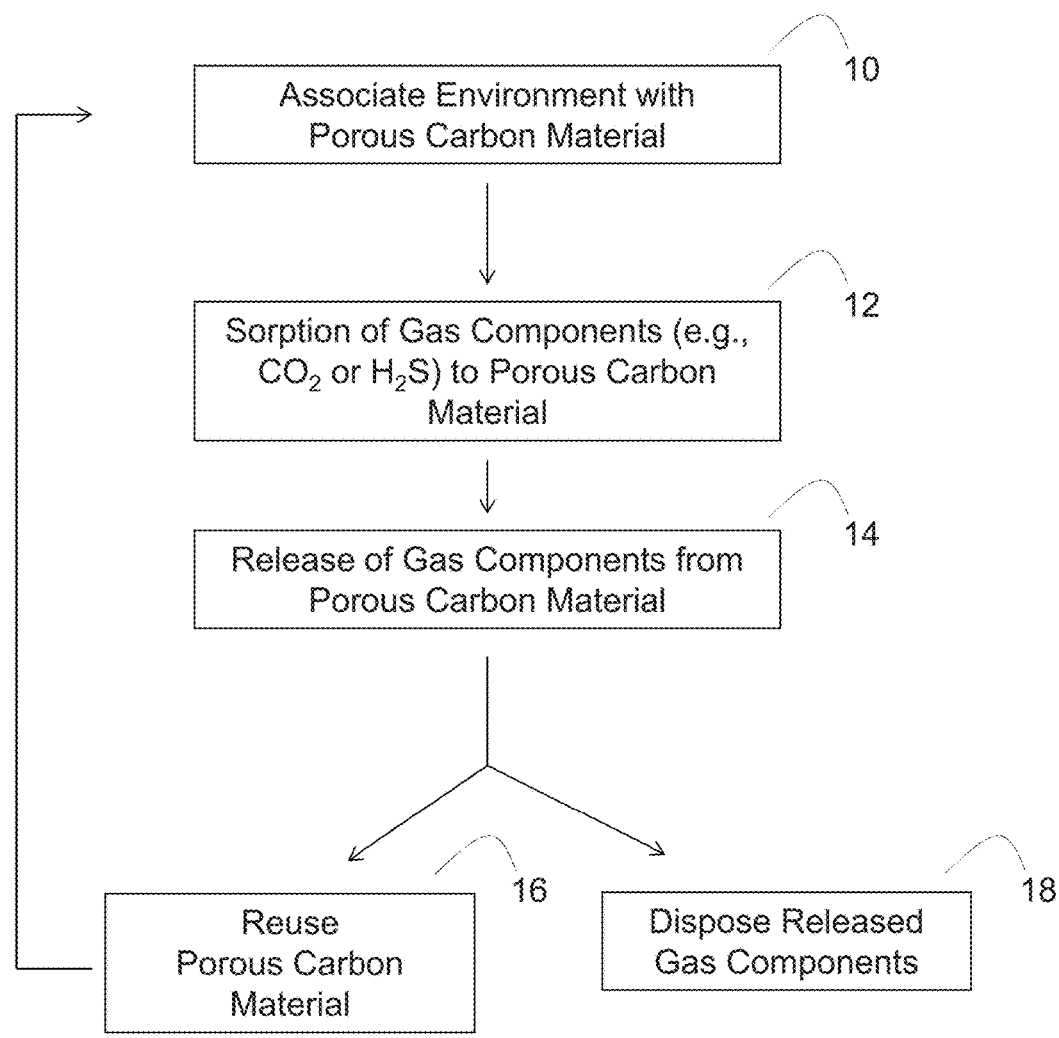
FIG. 1 provides a scheme of utilizing porous carbon materials to capture gas components (e.g., carbon dioxide ($CO_2$) or hydrogen sulfide ($H_2S$)) from an environment.

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Traditional gas sorbents, such as activated carbons and zeolites, show moderate $CO_2$ and $H_2S$ sorption capacity due to their high surface area. Moreover, the selectivity of such sorbents to $CO_2$ is very low, thereby limiting their application in oil and gas fields where $CO_2$ is present in the presence of hydrocarbon gases and other small organic and inorganic gases.

Although amine polymer modified silica show good gas uptake capacity, they require much more energy for regeneration. For instance, amine polymer modified silica may typically be heated to temperatures above 100° C. in order to be regenerated.

Aqueous sorbents (e.g., aqueous amine scrubbers) are also used to remove $CO_2$ and $H_2S$ from natural gas. However, many aqueous sorbents such as aqueous amines are corrosive. Moreover, $CO_2$ and $H_2S$-containing liquids require stringent heating (e.g., heating at temperatures between 125-140° C.) to liberate the gases from the aqueous sorbent (e.g., amine carbonate).

Other materials for $CO_2$ and $H_2S$ capture include metal oxide frameworks (MOFs), zeolites, ionic liquids, cryogenic distillation, membranes and metal oxides. However, many of such materials have hydrolytic instabilities or low densities that lead to low volumetric efficiencies or poor selectivity relative to methane or other hydrocarbons. Moreover, synthesis constraints or energy costs associated with these materials lessen their suitability for on-site $CO_2$ and $H_2S$ capture from various environments, such as environments containing natural gas streams.

As such, a need exists for improved $CO_2$ and $H_2S$ sorbents and gas capture methods that can be used to capture $CO_2$ and $H_2S$ more effectively without requiring stringent conditions, such as temperature swings. The present disclosure addresses these needs.

In some embodiments, the present disclosure pertains to methods of capturing gas components from an environment by utilizing various porous carbon materials that include a plurality of pores and a plurality of nucleophilic moieties (also referred to as nucleophilic porous carbons). In some embodiments illustrated in FIG. 1, the gas capture methods of the present disclosure include associating the environment with a porous carbon material (step 10) to result in sorption of gas components (e.g., $CO_2$, $H_2S$, and combinations thereof) to the porous carbon material (step 12). In some embodiments, the methods of the present disclosure also include a step of releasing the gas components from the porous carbon material (step 14). In some embodiments, the methods of the present disclosure also include a step of reusing the porous carbon material after the release of the gas components (step 16). In some embodiments, the methods of the present disclosure also include a step of disposing the released gas components (step 18).

Further embodiments of the present disclosure pertain to the porous carbon materials that are utilized for gas capture. As set forth in more detail herein, the gas capture methods and porous carbon materials of the present disclosure have numerous embodiments. For instance, various methods may be utilized to associate various types of porous carbon materials with various environments to result in the capture of various gas components from the environment. Moreover, the captured gas components may be released from the porous carbon materials in various manners.

Environments

The methods of the present disclosure may be utilized to capture gas components from various environments. In some embodiments, the environment includes, without limitation, industrial gas streams, natural gas streams, natural gas wells, industrial gas wells, oil and gas fields, and combinations thereof. In some embodiments, the environment is a subsurface oil and gas field. In more specific embodiments, the methods of the present disclosure may be utilized to capture $CO_2$ and $H_2S$ from an environment that contains natural gas, such as an oil well.

In some embodiments, the environment is a pressurized environment. For instance, in some embodiments, the environment has a total pressure higher than atmospheric pressure.

In some embodiments, the environment has a total pressure of about 0.1 bar to about 500 bar. In some embodiments, the environment has a total pressure of about 5 bar to about 100 bar. In some embodiments, the environment has a total pressure of about 25 bar to about 30 bar. In some embodiments, the environment has a total pressure of about 100 bar to about 200 bar. In some embodiments, the environment has a total pressure of about 200 bar to about 300 bar.

Gas Components

The methods of the present disclosure may be utilized to capture various gas components from an environment. For instance, in some embodiments, the captured gas component includes, without limitation, $CO_2$, $H_2S$, and combinations thereof. In some embodiments, the captured gas component includes $CO_2$. In some embodiments, the captured gas component includes $H_2S$. In some embodiments, the captured gas component includes $CO_2$ and $H_2S$.

Association of Porous Carbon Materials with an Environment

Various methods may be utilized to associate porous carbon materials of the present disclosure with an environment. In some embodiments, the association occurs by incubating the porous carbon materials with the environment (e.g., a pressurized environment). In some embodiments, the association of porous carbon materials with an environment occurs by flowing the environment through a structure that contains the porous carbon materials. In some embodiments, the structure may be a column or a sheet that contains immobilized porous carbon materials. In some embodiments, the structure may be a floating bed that contains porous carbon materials.

In some embodiments, the porous carbon materials are suspended in a solvent while being associated with an environment. In more specific embodiments, the solvent may include water or alcohol. In some embodiments, the porous carbon materials are associated with an environmental in pelletized form. In some embodiments, the pelletization can be used to assist flow of the gases through the porous carbon materials.

In some embodiments, the associating occurs by placing the porous carbon material at or near the environment. In some embodiments, such placement occurs by various methods that include, without limitation, adhesion, immobilization, clamping, and embedding. Additional methods by which to associate porous carbon materials with an environment can also be envisioned.

Gas Sorption to Porous Carbon Materials

The sorption of gas components (e.g., $CO_2$, $H_2S$, and combinations thereof) to porous carbon materials of the present disclosure can occur at various environmental pressures. For instance, in some embodiments, the sorption of gas components to porous carbon materials occurs above atmospheric pressure. In some embodiments, the sorption of gas components to porous carbon materials occurs at total pressures ranging from about 0.1 bar to about 500 bar. In some embodiments, the sorption of gas components to porous carbon materials occurs at total pressures ranging from about 5 bar to about 500 bar. In some embodiments, the sorption of gas components to porous carbon materials occurs at total pressures ranging from about 5 bar to about 100 bar. In some embodiments, the sorption of gas components to porous carbon materials occurs at total pressures ranging from about 25 bar to about 30 bar. In some embodiments, the sorption of gas components to porous carbon materials occurs at total pressures ranging from about 100 bar to about 500 bar. In some embodiments, the sorption of gas components to porous carbon materials occurs at total pressures ranging from about 100 bar to about 300 bar. In some embodiments, the sorption of gas components to porous carbon materials occurs at total pressures ranging from about 100 bar to about 200 bar.

The sorption of gas components to porous carbon materials can also occur at various temperatures. For instance, in some embodiments, the sorption of gas components to porous carbon materials occurs at temperatures that range from about 0° C. (e.g., a sea floor temperature where a wellhead may reside) to about 100° C. (e.g., a temperature where machinery may reside). In some embodiments, the sorption of gas components to porous carbon materials occurs at ambient temperature (e.g., temperatures ranging from about 20-25° C., such as 23° C.). In some embodiments, the sorption of gas components to porous carbon materials occurs below ambient temperature. In some embodiments, the sorption of gas components to porous carbon materials occurs above ambient temperature. In some embodiments, the sorption of gas components to porous carbon materials occurs without the heating of the porous carbon materials.

Without being bound by theory, it is envisioned that the sorption of gas components to porous carbon materials occurs by various molecular interactions between gas components (e.g., $CO_2$ or $H_2S$) and the porous carbon materials. For instance, in some embodiments, the sorption of gas components to porous carbon materials occurs by at least one of absorption, adsorption, ionic interactions, physisorption, chemisorption, covalent bonding, non-covalent bonding, hydrogen bonding, van der Waals interactions, acid-base interactions, and combinations of such mechanisms. In some embodiments, the sorption includes an absorption interaction between gas components (e.g., $CO_2$ or $H_2S$) in an environment and the porous carbon materials. In some embodiments, the sorption includes an ionic interaction between the gas components in an environment and the porous carbon materials. In some embodiments, the sorption includes an adsorption interaction between the gas components in an environment and the porous carbon materials. In some embodiments, the sorption includes a physisorption interaction between the gas components in an environment and the porous carbon materials. In some embodiments, the sorption includes a chemisorption interaction between the gas components in an environment and the porous carbon materials. In some embodiments, the sorption includes a covalent bonding interaction between the gas components in an environment and the porous carbon materials. In some embodiments, the sorption includes a non-covalent bonding interaction between the gas components in an environment and the porous carbon materials. In some embodiments, the sorption includes a hydrogen bonding interaction between the gas components in an environment and the porous carbon materials. In some embodiments, the sorption includes a van der Waals interaction between the gas components in an environment and the porous carbon materials. In some embodiments, the sorption includes an acid-base interaction between the gas components in an environment and the porous carbon materials. In some embodiments, the sorption of gas components to porous carbon materials occurs by adsorption and absorption.

$CO_2$ Sorption

In some embodiments, the sorption of gas components to porous carbon materials includes the sorption of $CO_2$ to the porous carbon materials. In some embodiments, the sorption of $CO_2$ to porous carbon materials occurs at a partial $CO_2$ pressure of about 0.1 bar to about 100 bar. In some embodiments, the sorption of $CO_2$ to porous carbon materials occurs at a partial $CO_2$ pressure of about 5 bar to about 30 bar. In some embodiments, the sorption of $CO_2$ to porous carbon materials occurs at a partial $CO_2$ pressure of about 30 bar.

Without being bound by theory, it is envisioned that $CO_2$ sorption may be facilitated by various chemical reactions. For instance, in some embodiments, the sorbed $CO_2$ is converted to poly($CO_2$) within the pores of the porous carbon materials. In some embodiments, the poly($CO_2$) comprises the following formula: $-(O-C(=O))_n-$, where n is equal to or greater than 2. In some embodiments, n is between 2 to 10,000. In some embodiments, the formed poly($CO_2$) may be further stabilized by van der Waals interactions with the carbon surfaces in the pores of the carbon materials. In some embodiments, the formed poly($CO_2$) may be in solid form.

In some embodiments, the sorption of $CO_2$ to the porous carbon materials occurs selectively. For instance, in some embodiments, the sorption of $CO_2$ to the porous carbon materials occurs selectively over hydrocarbons in the environment (e.g., ethane, propane, butane, pentane, methane, and combinations thereof). In further embodiments, the molecular ratio of sorbed $CO_2$ to sorbed hydrocarbons in the porous carbon materials is greater than about 2. In additional embodiments, the molecular ratio of sorbed $CO_2$ to sorbed hydrocarbons in the porous carbon materials ranges from about 2 to about 5. In additional embodiments, the molecular ratio of sorbed $CO_2$ to sorbed hydrocarbons in the porous carbon materials is about 2.6.

In some embodiments, the sorption of $CO_2$ to porous carbon materials occurs selectively over the $CH_4$ in the environment. In some embodiments, the molecular ratio of sorbed $CO_2$ to sorbed $CH_4$ ($n_{CO2}/n_{CH4}$) in the porous carbon materials is greater than about 2. In some embodiments, $n_{CO2}/n_{CH4}$ in the porous carbon materials ranges from about 2 to about 5. In more specific embodiments, $n_{CO2}/n_{CH4}$ in the porous carbon materials is about 2.6.

In some embodiments, sorption of $CO_2$ to porous carbon materials occurs selectively through poly($CO_2$) formation within the pores of the porous carbon materials. Without being bound by theory, it is envisioned that poly($CO_2$) formation within the pores of the porous carbon materials can displace other gas components associated with the porous carbon materials, including any physisorbed gas components and hydrocarbons (e.g., methane, propane, and butane). Without being bound by further theory, it is also envisioned that the displacement of other gas components from the porous carbon materials creates a continual $CO_2$ selectivity that far exceeds various $CO_2$ selectively ranges, including the $CO_2$ selectivity ranges noted above.

In some embodiments, the covalent bond nature of poly($CO_2$) within the pores of the porous carbon materials can be 100 times stronger than that of other physisorbed entities, including physisorbed gas components within the pores of the porous carbon materials. Therefore, such strong covalent bonds can contribute to the displacement of the physisorbed gas components (e.g., methane, propane and butane).

$H_2S$ Sorption

In some embodiments, the sorption of gas components to porous carbon materials includes the sorption of $H_2S$ to the porous carbon materials. In some embodiments, the sorption of $H_2S$ to porous carbon materials occurs at a partial $H_2S$ pressure of about 0.1 bar to about 100 bar. In some embodiments, the sorption of $H_2S$ to porous carbon materials occurs at a partial $H_2S$ pressure of about 5 bar to about 30 bar. In some embodiments, the sorption of $H_2S$ to porous carbon materials occurs at a partial $H_2S$ pressure of about 30 bar.

Without being bound by theory, it is envisioned that $H_2S$ sorption may be facilitated by various chemical reactions. For instance, in some embodiments, sorbed $H_2S$ may be converted within the pores of the porous carbon materials to at least one of elemental sulfur (S), sulfur dioxide ($SO_2$), sulfuric acid ($H_2SO_4$), and combinations thereof. In some embodiments, the captured $H_2S$ is converted to elemental sulfur at. In some embodiments, the aforementioned conversion can be facilitated by the presence of oxygen. For instance, in some embodiments, the introduction of small amounts of oxygen into a system containing porous carbon materials can facilitate the conversion of $H_2S$ to elemental sulfur. In some embodiments, the oxygen can be introduced either continuously or periodically. In some embodiments, the oxygen can be introduced from air.

In some embodiments, the captured $H_2S$ is converted by catalytic oxidation to elemental sulfur at ambient temperature. Thereafter, further oxidation to $SO_2$ and $H_2SO_4$ occurs at higher temperatures.

Figure 15:
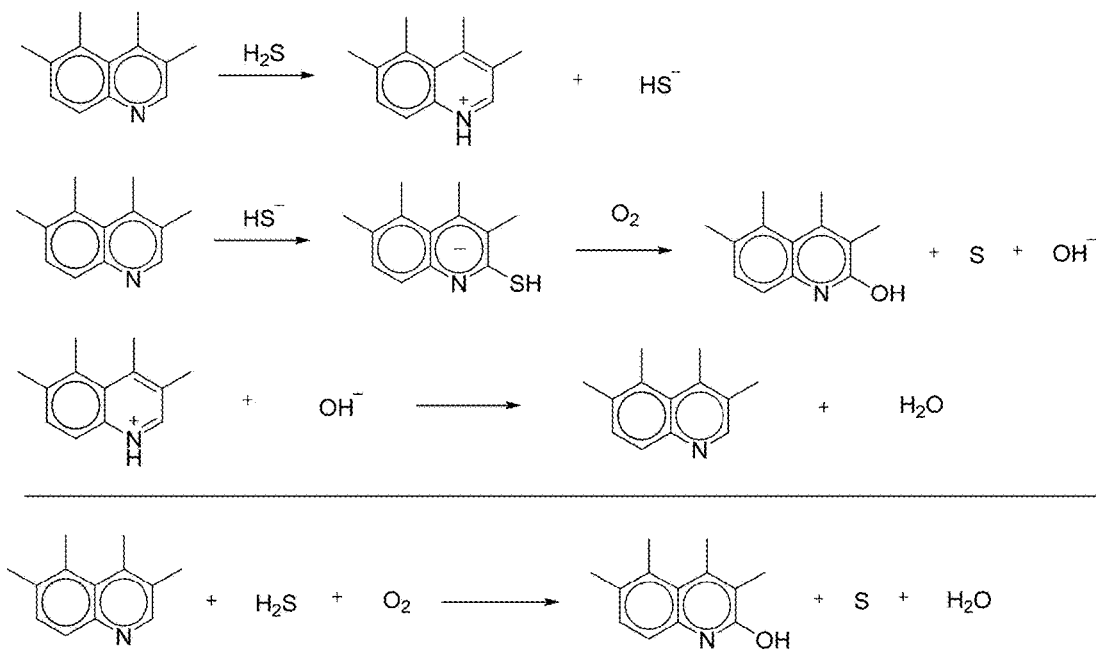
FIG. 15 provides schemes of $CO_2$ capture from materials relating to the formation of chemisorbed oxygen species on porous carbon materials as a result of their reaction with $H_2S$ and $O_2$. The porous carbon material was first reacted with $H_2S$ and air, and then thermalized with or without ammonia, and finally used for reversible $CO_2$ capture.

In some embodiments, nitrogen groups of porous carbon materials may facilitate the conversion of $H_2S$ to elemental sulfur. For instance, in some embodiments illustrated in the schemes in FIG. 15, nitrogen functional groups on porous carbon materials may facilitate the dissociation of $H_2S$ to $HS^-$. In some embodiments, the nitrogen functional groups may also facilitate the formation of chemisorbed oxygen species (Seredych, M.; Bandosz, T. J. J. Phys. Chem. C 2008, 112, 4704-4711).

In some embodiments, the porous carbon material becomes impregnated with the sulfur derived from captured $H_2S$ to form sulfur-impregnated porous carbon materials. In some embodiments, the formation of sulfur-impregnated porous carbon materials may be facilitated by heating. In some embodiments, the heating occurs at temperatures higher than $H_2S$ capture temperatures. In some embodiments, the heating occurs in the absence of oxygen. In some embodiments, the sulfur impregnated porous carbon materials can be used to efficiently capture $CO_2$ by the aforementioned methods.

In some embodiments, the sorption of $H_2S$ to porous carbon materials occurs in intact form. In some embodiments, the sorption of $H_2S$ to porous carbon materials in intact form occurs in the absence of oxygen.

$CO_2$ and $H_2S$ Sorption

In some embodiments, the sorption of gas components to porous carbon materials includes the sorption of both $H_2S$ and $CO_2$ to the porous carbon materials. In some embodiments, the sorption of $H_2S$ and $CO_2$ to the porous carbon material occurs at the same time.

In some embodiments, the sorption of $CO_2$ to the porous carbon material occurs before the sorption of $H_2S$ to the porous carbon material. For instance, in some embodiments, a gas containing $CO_2$ and $H_2S$ flows through a structure that contains porous carbon materials (e.g., trapping cartridges). $CO_2$ is first captured from the gas as the gas flows through the structure. Thereafter, $H_2S$ is captured from the gas as the gas continues to flow through the structure.

In some embodiments, the sorption of $H_2S$ to the porous carbon material occurs before the sorption of $CO_2$ to the porous carbon material. For instance, in some embodiments, a gas containing $CO_2$ and $H_2S$ flows through a structure that contains porous carbon materials (e.g., trapping cartridges). $H_2S$ is first captured from the gas as the gas flows through the structure. Thereafter, $CO_2$ is captured from the gas as the gas continues to flow through the structure.

In some embodiments, the porous carbon materials that capture $H_2S$ from the gas include nitrogen-containing porous carbon materials, as described in more detail herein. In some embodiments, the porous carbon materials that capture $CO_2$ from the gas include sulfur-containing porous carbon materials that are also described in more detail herein.

Release of Captured Gas

In some embodiments, the methods of the present disclosure also include a step of releasing captured gas components from porous carbon materials. Various methods may be utilized to release captured gas components from porous carbon materials. For instance, in some embodiments, the releasing occurs by decreasing the pressure of the environment. In some embodiments, the pressure of the environment is reduced to atmospheric pressure or below atmospheric pressure. In some embodiments, the releasing occurs by placing the porous carbon material in a second environment that has a lower pressure than the environment where gas capture occurred. In some embodiments, the second environment may be at or below atmospheric pressure. In some embodiments, the releasing occurs spontaneously as the environmental pressure decreases.

The release of captured gas components from porous carbon materials can occur at various pressures. For instance, in some embodiments, the release occurs at or below atmospheric pressure. In some embodiments, the release occurs at total pressures ranging from about 0 bar to about 100 bar. In some embodiments, the release occurs at total pressures ranging from about 0.1 bar to about 50 bar.

In some embodiments, the release occurs at total pressures ranging from about 0.1 bar to about 30 bar. In some embodiments, the release occurs at total pressures ranging from about 0.1 bar to about 10 bar.

The release of captured gas components from porous carbon materials can also occur at various temperatures. In some embodiments, the releasing occurs at ambient temperature. In some embodiments, the releasing occurs at the same temperature at which gas sorption occurred. In some embodiments, the releasing occurs without heating the porous carbon materials. Therefore, in some embodiments, a temperature swing is not required to release captured gas components from porous carbon materials.

In some embodiments, the releasing occurs at temperatures ranging from about 30° C. to about 200° C. In some embodiments, the releasing is facilitated by also lowering the pressure.

In some embodiments, the releasing occurs by heating the porous carbon materials. For instance, in some embodiments, the releasing occurs by heating the porous carbon materials to temperatures between about 50° C. to about 200° C. In some embodiments, the releasing occurs by heating the porous carbon materials to temperatures between about 75° C. to about 125° C. In some embodiments, the releasing occurs by heating the porous carbon materials to temperatures ranging from about 50° C. to about 100° C. In some embodiments, the releasing occurs by heating the porous carbon materials to a temperature of about 90° C.

In some embodiments, heat for release of gas components from porous carbon materials can be supplied from various sources. For instance, in some embodiments, the heat for the release of gas components from a porous carbon material-containing vessel can be provided by an adjacent vessel whose heat is being generated during a gas sorption step.

In some embodiments, the release of captured gas components from an environment includes the release of captured $CO_2$ from porous carbon materials. Without being bound by theory, it is envisioned that the release of captured $CO_2$ from porous carbon materials can occur by various mechanisms. For instance, in some embodiments, the release of captured $CO_2$ can occur through a depolymerization of the formed poly($CO_2$) within the pores of the porous carbon materials. In some embodiments, the depolymerization can be facilitated by a decrease in environmental pressure. In some embodiments, the releasing of the $CO_2$ occurs by decreasing the pressure of the environment or placing the porous carbon material in a second environment that has a lower pressure than the environment where $CO_2$ capture occurred.

In some embodiments, the release of captured gas components from an environment includes the release of captured $H_2S$ from porous carbon materials. In some embodiments, the captured $H_2S$ is released in intact form.

In some embodiments, $H_2S$ is released from porous carbon materials by heating the porous carbon materials. In some embodiments, $H_2S$ is released from porous carbon materials by heating the porous carbon materials to temperatures that range from about 50° C. to about 200° C. In some embodiments, $H_2S$ is released from the porous carbon materials by heating the porous carbon materials to temperatures between about 75° C. to about 125° C. In some embodiments, $H_2S$ is released from the porous carbon materials by heating the porous carbon materials to temperatures between about 50° C. to about 100° C. In some embodiments, $H_2S$ is released from the porous carbon materials by heating the porous carbon materials to a temperature of about 90° C.

In some embodiments, the release of captured $H_2S$ can occur through conversion of $H_2S$ to at least one of elemental sulfur (S), sulfur dioxide ($SO_2$), sulfuric acid ($H_2SO_4$), and combinations thereof. In some embodiments, elemental sulfur is retained on the porous carbon material to form sulfur-impregnated porous carbon materials. In some embodiments, the sulfur-containing porous carbon material can be discarded through incineration or burial, or it can be further used to capture $CO_2$ in a reversible fashion.

In some embodiments, the release of captured gas components can occur in a sequential manner. For instance, in some embodiments where the sorbed gas components include both $CO_2$ and $H_2S$, the releasing of the $CO_2$ occurs by decreasing the pressure of the environment or placing the porous carbon material in a second environment that has a lower pressure than the environment where $CO_2$ capture occurred. In some embodiments, the releasing of the $H_2S$ occurs by heating the porous carbon material (e.g., at temperatures ranging from about 50° C. to about 100° C.). In some embodiments, the releasing of the $CO_2$ occurs before the releasing of the $H_2S$. In some embodiments, the releasing of the $H_2S$ occurs before the releasing of the $CO_2$. In some embodiments, the releasing occurs in an environment that lacks oxygen.

Disposal of Released Gas

In some embodiments, the methods of the present disclosure also include a step of disposing the released gas components. For instance, in some embodiments, the released gas components can be off-loaded into a container. In some embodiments, the released gas components can be pumped downhole for long-term storage. In some embodiments, the released gas components can be vented to the atmosphere. In some embodiments, the released gas components include, without limitation, $CO_2$, $H_2S$, $SO_2$, and combinations thereof.

Reuse of the Porous Carbon Material

In some embodiments, the methods of the present disclosure also include a step of reusing the porous carbon materials after gas component release to capture more gas components from an environment. In some embodiments, the porous carbon materials of the present disclosure may be reused over 100 times without substantially affecting their gas sorption capacities. In some embodiments, the porous carbon materials of the present disclosure may be reused over 1000 times without substantially affecting their gas sorption capacities. In some embodiments, the porous carbon materials of the present disclosure may be reused over 10,000 times without substantially affecting their gas sorption capacities.

In some embodiments, the porous carbon materials of the present disclosure may retain 100% of their $CO_2$ or $H_2S$ sorption capacities after being used multiple times (e.g., 100 times, 1,000 times or 10,000 times). In some embodiments, the porous carbon materials of the present disclosure may retain at least 98% of their $CO_2$ or $H_2S$ sorption capacities after being used multiple times (e.g., 100 times, 1,000 times or 10,000 times). In some embodiments, the porous carbon materials of the present disclosure may retain at least 95% of their $CO_2$ or $H_2S$ sorption capacities after being used multiple times (e.g., 100 times, 1,000 times or 10,000 times). In some embodiments, the porous carbon materials of the present disclosure may retain at least 90% of their $CO_2$ or $H_2S$ sorption capacities after being used multiple times (e.g., 100 times, 1,000 times or 10,000 times). In some embodiments, the porous carbon materials of the present disclosure may retain at least 80% of their $CO_2$ or $H_2S$ sorption capacities after being used multiple times (e.g., 100 times, 1,000 times or 10,000 times).

Porous Carbon Materials

The methods of the present disclosure can utilize various types of porous carbon materials for gas capture. Further embodiments of the present disclosure pertain to such porous carbon materials. In general, the porous carbon materials of the present disclosure include a plurality of pores and a plurality of nucleophilic moieties. As set forth in more detail herein, various porous carbon materials with various porosities and nucleophilic moieties may be utilized. Furthermore, the porous carbon materials of the present disclosure may have various surface areas, pore diameters, pore volumes, densities, and gas sorption capacities.

Carbon Materials

The porous carbon materials of the present disclosure may be derived from various carbon materials. For instance, in some embodiments, the porous carbon materials of the present disclosure may include, without limitation, nucleophilic polymers, polypeptides, proteins, waste materials, nitrogen-containing porous carbon materials, sulfur-containing porous carbon materials, metal-containing porous carbon materials, metal oxide-containing porous carbon materials, metal sulfide-containing porous carbon materials, phosphorous-containing porous carbon materials, and combinations thereof. In some embodiments, the porous carbon materials of the present disclosure may include whey proteins. In some embodiments, the porous carbon materials of the present disclosure may include rice proteins. In some embodiments, the porous carbon materials of the present disclosure may include food waste7. In some embodiments, the porous carbon materials of the present disclosure may include carbohydrates, cotton, fat, and combinations thereof. In some embodiments, the porous carbon material is carbonized. In some embodiments, the porous carbon material is reduced. In some embodiments, the porous carbon material is reduced and carbonized.

In more specific embodiments, the porous carbon materials of the present disclosure include a nucleophilic polymer. In some embodiments, the nucleophilic polymer includes, without limitation, nitrogen-containing polymers, sulfur-containing polymers, polythiophene (PTH), polythiophene-methanol (also called 2-(hydroxymethyl)thiophene), polyacrylonitrile (PAN), polypyrrole, and combinations thereof. In some embodiments, the nucleophilic polymer is carbonized. In some embodiments, the nucleophilic polymer is reduced. In some embodiments, the nucleophilic polymer is reduced and carbonized. In some embodiments, the nucleophilic polymer is reduced with hydrogen ($H_2$) treatment.

In additional embodiments, the porous carbon materials of the present disclosure include nitrogen containing porous carbons. In some embodiments, the nitrogen groups in the nitrogen containing porous carbons include at least one of pyridinic nitrogen (N-6), pyrrolic nitrogen (N-5), nitrogen oxides, and combinations thereof. In more specific embodiments, the nitrogen groups in the nitrogen containing porous carbons include nitrogen oxides, such as N-oxides. In some embodiments, the nitrogen containing porous carbons may include a nitrogen containing polymer, such as polyacrylonitrile. In some embodiments, the nitrogen containing porous carbons include carbonized polyacrylontrile, such as reduced and carbonized polyacrylonitrile.

In some embodiments, the porous carbons of the present disclosure include sulfur containing porous carbons. In more specific embodiments, the sulfur containing porous carbons include a polythiophene, such as poly[(2-hydroxymethyl) thiophene]. In further embodiments, the porous carbons of the present disclosure include polymer-derived nitrogen containing porous carbons with primary amines, secondary amines, tertiary amines, or nitrogen oxides. In some embodiments, the porous carbons of the present disclosure include polymer-derived sulfur containing porous carbons with primary sulfur groups (e.g., thiol), secondary sulfur groups, or sulfur oxides.

The porous carbon materials of the present disclosure may be fabricated by various methods. For instance, in some embodiments where porous carbon materials include nucleophilic polymers, nucleophilic polymer precursors may be polymerized to form the porous carbon materials. In some embodiments, the nucleophilic polymer precursors may be polymerized through treatment with a base, such as metal hydroxides, metal oxides, potassium hydroxide (KOH), sodium hydroxide (NaOH), lithium hydroxide (LiOH), cesium hydroxide (CsOH), magnesium hydroxide ($Mg(OH)_2$), calcium hydroxide ($Ca(OH)_2$), and combinations thereof. In some embodiments, the formed nucleophilic polymer materials may also be carbonized. In some embodiments, the formed nucleophilic polymers may also be reduced. In some embodiments, the formed nucleophilic polymers may be carbonized and reduced.

Nucleophilic Moieties

The porous carbon materials of the present disclosure may contain various arrangements of nucleophilic moieties. In some embodiments, the nucleophilic moieties are part of the porous carbon material. For instance, in some embodiments, the nucleophilic moieties are embedded within the porous carbon materials. In some embodiments, the nucleophilic moieties are homogenously distributed throughout the porous carbon material framework. In some embodiments, the nucleophilic moieties are embedded within the plurality of the pores of the porous carbon materials.

The porous carbon materials of the present disclosure may also contain various types of nucleophilic moieties. For instance, in some embodiments, the nucleophilic moieties include, without limitation, primary nucleophiles, secondary nucleophiles, tertiary nucleophiles and combinations thereof. In more specific embodiments, the nucleophilic moieties include, without limitation, oxygen-containing moieties, sulfur-containing moieties, metal-containing moieties, nitrogen-containing moieties, metal oxide-containing moieties, metal sulfide-containing moieties, phosphorous-containing moieties, and combinations thereof.

In some embodiments, the nucleophilic moieties include phosphorous-containing moieties. In some embodiments, the phosphorous containing moieties include, without limitation, phosphines, phosphites, phosphine oxides, and combinations thereof.

In some embodiments, the nucleophilic moieties of the present disclosure may include metal-containing moieties, such as metal oxide-containing moieties or metal sulfide containing moieties. In some embodiments, the metal-containing moieties may include metal centers. In some embodiments, the metal-containing moieties may include, without limitation, iron oxide, iron sulfide, aluminum oxide, silicon oxide, titanium oxide, and combinations thereof. In some embodiments, the metal-containing moieties of the present disclosure include iron oxide. In some embodiments, the metal-containing moieties of the present disclosure include iron sulfide.

In some embodiments, the nucleophilic moieties of the present disclosure include nitrogen-containing moieties. In some embodiments where the porous carbon materials include nitrogen containing porous carbons, the nitrogen-containing moieties include the nitrogen groups within the porous carbons. In some embodiments, the nitrogen-containing moieties include, without limitation, primary amines, secondary amines, tertiary amines, nitrogen oxides, and combinations thereof. In some embodiments, the nitrogen-containing moieties include secondary amines. In some embodiments, the nitrogen-containing moieties include at least one of pyridinic nitrogen (N-6), pyrrolic nitrogen (N-5), nitrogen oxides, and combinations thereof. In some embodiments, the nitrogen containing moieties include nitrogen oxides, such as N-oxides.

In some embodiments, the nucleophilic moieties of the present disclosure include sulfur-containing moieties. In some embodiments where the porous carbon materials include sulfur-containing porous carbons, the sulfur-containing moieties include the sulfur groups within the porous carbons. In some embodiments, the sulfur-containing moieties include, without limitation, primary sulfurs, secondary sulfurs, sulfur-oxides, and combinations thereof. In some embodiments, the sulfur-containing moieties include secondary sulfurs. In some embodiments, the sulfur-containing moieties include thiophene groups. In some embodiments, the thiophene groups include thiophenic sulfur atoms that are incorporated into the porous carbon material framework through the formation of C—S—C bonds.

Surface Areas

The porous carbon materials of the present disclosure may have various surface areas. For instance, in some embodiments, the porous carbon materials of the present disclosure have surface areas that range from about 1,000 $m^2/g$ to about 3,000 $m^2/g$. In some embodiments, the porous carbon materials of the present disclosure have surface areas that range from about 1,000 $m^2/g$ to about 2,000 $m^2/g$. In some embodiments, the porous carbon materials of the present disclosure have surface areas that range from about 1,400 $m^2/g$ to about 2,500 $m^2/g$. In some embodiments, the porous carbon materials of the present disclosure have surface areas that include at least one of 1450 $m^2\ g^{-1}$, 1,500 $m^2/g$, 1,700 $m^2/g$, 1,900 $m^2/g$, or 2500 $m^2\ g^{-1}$.

Porosities

The porous carbon materials of the present disclosure may have various porosities. For instance, in some embodiments, the pores in the porous carbon materials include diameters between about 1 nanometer to about 5 micrometers. In some embodiments, the pores include macropores with diameters of at least about 50 nm. In some embodiments, the pores include macropores with diameters between about 50 nanometers to about 3 micrometers. In some embodiments, the pores include macropores with diameters between about 500 nanometers to about 2 micrometers. In some embodiments, the pores include mesopores with diameters of less than about 50 nm. In some embodiments, the pores include micropores with diameters of less than about 2 nm. In some embodiments, the pores include diameters that range from about 5 nm to about 100 nm.

The pores of the porous carbon materials of the present disclosure may also have various volumes. For instance, in some embodiments, the pores in the porous carbon materials have volumes ranging from about 1 $cm^3/g$ to about 10 $cm^3/g$. In some embodiments, the pores in the porous carbon materials have volumes ranging from about 1 $cm^3/g$ to about 5 $cm^3/g$. In some embodiments, the pores in the porous carbon materials have volumes ranging from about 1 $cm^3/g$ to about 3 $cm^3/g$. In more specific embodiments, the plurality of pores in the porous carbon materials have volumes of about 1.5 $cm^3/g$ or about 1.43 $cm^3/g$.

Densities

The porous carbon materials of the present disclosure may also have various densities. For instance, in some embodiments, the porous carbon materials of the present disclosure have densities that range from about 0.3 $g/cm^3$ to about 10 $g/cm^3$. In some embodiments, the porous carbon materials of the present disclosure have densities that range from about 0.3 $g/cm^3$ to about 4 $g/cm^3$. In some embodiments, the porous carbon materials of the present disclosure have densities that range from about 1 $g/cm^3$ to about 3 $g/cm^3$. In some embodiments, the porous carbon materials of the present disclosure have densities that range from about 1 $g/cm^3$ to about 2 $g/cm^3$. In some embodiments, the porous carbon materials of the present disclosure have densities that range from about 2 $g/cm^3$ to about 3 $g/cm^3$. In more specific embodiments, the porous carbon materials of the present disclosure have densities of 1.2 $g/cm^3$, 2 $g/cm^3$, 2.1 $g/cm^3$, 2.20 $g/cm^3$, 2.21 $g/cm^3$, or 2.5 $g/cm^3$.

$CO_2$ Sorption Capacities

The porous carbon materials of the present disclosure may also have various $CO_2$ sorption capacities. For instance, in some embodiments, the porous carbon materials of the present disclosure have a $CO_2$ sorption capacity that ranges from about 10 wt % to about 200 wt % of the porous carbon material weight. In some embodiments, the porous carbon materials of the present disclosure have a $CO_2$ sorption capacity of about 50 wt % to about 180 wt % of the porous carbon material weight. In some embodiments, the porous carbon materials of the present disclosure have a $CO_2$ sorption capacity of about 55 wt % to about 90 wt % of the porous carbon material weight. In some embodiments, the porous carbon materials of the present disclosure have a $CO_2$ sorption capacity of about 55 wt % to about 85 wt % of the porous carbon material weight. In more specific embodiments, the porous carbon materials of the present disclosure have a $CO_2$ sorption capacity of about 58 wt % or about 82 wt % of the porous carbon material weight.

In further embodiments, the porous carbon materials of the present disclosure have a $CO_2$ sorption capacity of about 1 g to about 2 g of porous carbon material per 1 g of $CO_2$. In more specific embodiments, the porous carbon materials of the present disclosure have a $CO_2$ sorption capacity of about 1.5 g of porous carbon material weight per 1 g of $CO_2$.

$H_2S$ Sorption Capacities

The porous carbon materials of the present disclosure may also have various $H_2S$ sorption capacities. For instance, in some embodiments, the porous carbon materials of the present disclosure have a $H_2S$ sorption capacity that ranges from about 10 wt % to about 200 wt % of the porous carbon material weight. In some embodiments, the porous carbon materials of the present disclosure have a $H_2S$ sorption capacity of about 10 wt % to about 100 wt % of the porous carbon material weight. In some embodiments, the porous carbon materials of the present disclosure have a $H_2S$ sorption capacity of about 10 wt % to about 75 wt % of the porous carbon material weight. In some embodiments, the porous carbon materials of the present disclosure have a $H_2S$ sorption capacity of about 15 wt % to about 65 wt % of the porous carbon material weight. In more specific embodiments, the porous carbon materials of the present disclosure have a $H_2S$ sorption capacity of about 18 wt % to about 61 wt % of the porous carbon material weight.

In further embodiments, the porous carbon materials of the present disclosure have a $H_2S$ sorption capacity of about 0.1 g to about 2 g of sulfur from $H_2S$ per 1 g of porous carbon material. In some embodiments, the porous carbon materials of the present disclosure have a $H_2S$ sorption capacity of about 0.1 g to about 1 g of sulfur from $H_2S$ per 1 g of porous carbon material. In some embodiments, the porous carbon materials of the present disclosure have a $H_2S$ sorption capacity of about 0.1 g to about 0.75 g of sulfur from $H_2S$ per 1 g of porous carbon material. In some embodiments, the porous carbon materials of the present disclosure have a $H_2S$ sorption capacity of about 0.15 g to about 0.65 g of sulfur from $H_2S$ per 1 g of porous carbon material. In some embodiments, the porous carbon materials of the present disclosure have a $H_2S$ sorption capacity of about 0.18 g to about 0.61 g of sulfur from $H_2S$ per 1 g of porous carbon material.

Physical States

The porous carbon materials of the present disclosure may be in various states. For instance, in some embodiments, the porous carbon materials of the present disclosure may be in a solid state. In some embodiments, the porous carbon materials of the present disclosure may be in a gaseous state. In some embodiments, the porous carbon materials of the present disclosure may be in a liquid state.

Advantages

The gas capture methods and the porous carbon materials of the present disclosure provide numerous advantages over prior gas sorbents. In particular, the porous carbon materials of the present disclosure provide significantly higher $CO_2$ and $H_2S$ sorption capacities than traditional $CO_2$ sorbents. For instance, as set forth in the Examples herein, the $CO_2$ sorption capacities of the porous carbon materials can be nearly 3-5 times higher than that found in zeolite 5A, and 2-3 times higher than that found in ZIF-8.

Furthermore, unlike traditional gas sorbents, the porous carbon materials of the present disclosure can selectively capture and release $CO_2$ at ambient temperature without requiring a temperature swing. For instance, unlike traditional $CO_2$ sorbents that require substantial heating for regeneration, the porous carbon materials of the present disclosure can be spontaneously regenerated through pressure swings. Moreover, $H_2S$ can be released from the porous carbon materials of the present disclosure without requiring excessive heating.

As such, the porous carbon materials of the present disclosure can avoid substantial thermal insults and be used effectively over successive cycles without losing their original gas sorption capacities. Moreover, due to the availability and affordability of the starting materials, the porous carbon materials of the present disclosure can be made in a facile and economical manner in bulk quantities, unlike many metal-oxide framework (MOF) materials.

Accordingly, the gas capture methods and the porous carbon materials of the present disclosure can find numerous applications. For instance, in some embodiments, the gas capture methods and the porous carbon materials of the present disclosure can be utilized for the capture of $CO_2$ and $H_2S$ from subsurface oil and gas fields. In more specific embodiments, the process may take advantage of differential pressures commonly found in natural gas collection and processing streams as a driving force during $CO_2$ and $H_2S$ capture. For instance, in some embodiments, the methods of the present disclosure may utilize a natural gas-well pressure (e.g., a natural gas well pressure of 200 to 300 bar) as a driving force during $CO_2$ and $H_2S$ capture. Thereafter, by lowering the pressure back to ambient conditions after $CO_2$ and $H_2S$ uptake, the captured gas can be off-loaded or pumped back downhole into the structures that had held it for geological timeframes. Moreover, the gas capture methods and the porous carbon materials of the present disclosure can allow for the capture and reinjection of $CO_2$ and $H_2S$ at the natural gas sites, thereby leading to greatly reduced $CO_2$ and $H_2S$ emissions from natural gas streams.

In some embodiments, the methods of the present disclosure can be utilized for the selective release of captured $CO_2$ and $H_2S$. For instance, in some embodiments where a porous carbon material has captured both $CO_2$ and $H_2S$, the lowering of environmental pressure can result in the release of $CO_2$ from the porous carbon material and the retainment of the captured $H_2S$ from the porous carbon material. Thereafter, the captured $H_2S$ may be released from the porous carbon material by heating the porous carbon material (e.g., at temperatures between about 50° C. to about 100° C.). In additional embodiments where a porous carbon material has captured both $CO_2$ and $H_2S$, the heating of the porous carbon material (e.g., at temperatures between about 50° C. to about 100° C.) can result in the release of the captured $H_2S$ and the retainment of the captured $CO_2$. Thereafter, the lowering of environmental pressure can result in the release of $CO_2$ from the porous carbon material.

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1

Capture of $CO_2$ by Sulfur- and Nitrogen-Containing Porous Carbons

In this Example, nucleophilic porous carbons are synthesized from simple and inexpensive carbon-sulfur and carbon-nitrogen precursors. Infrared, Raman and $^{13}C$ nuclear magnetic resonance signatures substantiate $CO_2$ fixation by polymerization in the carbon channels to form poly($CO_2$) under much lower pressures than previously required. This growing chemisorbed sulfur- or nitrogen-atom-initiated poly($CO_2$) chain further displaces physisorbed hydrocarbon, providing a continuous $CO_2$ selectivity. Once returned to ambient conditions, the poly($CO_2$) spontaneously depolymerizes, leading to a sorbent that can be easily regenerated without the thermal energy input that is required for traditional sorbents.

More specifically, Applicants show in this Example that the new carbon materials can be used to separate $CO_2$ from various environments (e.g., natural gas), where 0.82 g of $CO_2$ per g of sorbent (82 wt %) can be captured at 30 bar. A mechanism is described where $CO_2$ is polymerized in the channels of the porous carbon materials, as initiated by the sulfur or nitrogen atoms that are part of the carbon framework. Moreover, no temperature swing is needed. The reaction proceeds at ambient temperature. Without being bound by theory, it is envisioned that heat transfer between cylinders during the exothermic sorption and endothermic desorption can provide the requisite thermodynamic exchanges.

In some instances, the process can use the natural gas-well pressure of 200 to 300 bar as a driving force during the polymerization. By lowering the pressure back to ambient conditions after $CO_2$ uptake, the poly($CO_2$) is then depolymerized, where it can be off-loaded or pumped back downhole into the structures that had held it for geological timeframes.

Example 1.1

Synthesis and Characterization of Porous Carbons

Sulfur- and nitrogen-containing porous carbons (SPC and NPC, respectively) were prepared by treating bulk precursor polymers with potassium hydroxide (KOH) at 600° C., as described previously (*Carbon* 44, 2816-2821 (2006); *Carbon* 50, 5543-5553 (2012)).

Figure 3:
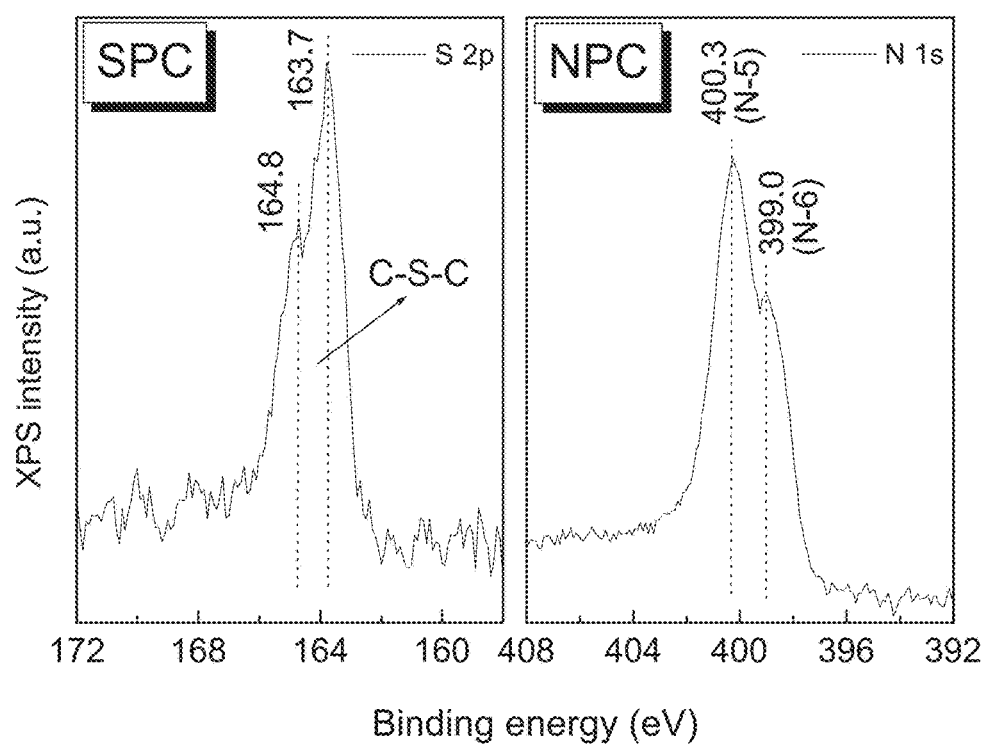
FIG. 3 provides x-ray photoelectron spectroscopy (XPS) of SPCs (left panel) and NPCs (right panel). The XPS indicates 13.3 atomic % of S in the SPC precursor and 22.4 atomic % of N in the NPC precursor. The resulting SPC and NPC then had 8.1 atomic % of S content and 6.2 atomic % of N content, respectively. The $S_{2p}$ and $N_{1s}$ XPS peaks were taken from the SPC and NPC. The $S_{2p}$ core splits into two main peaks of 163.7 ($2p_{3/2}$) and 164.8 eV ($2p_{1/2}$), which correspond to thiophenic sulfur atoms incorporated into the porous carbon framework via the formation of C—S—C bond. The $N_1$ reflects two different chemical environments: pyridinic nitrogen (N-6) and pyrrolic nitrogen (N-5) atoms.

As shown in FIG. 2A, the resulting products were solid porous carbon materials with homogeneously distributed sulfur or nitrogen atoms incorporated into the carbon framework. They exhibited pores and channel structures as well as high surface areas of 2500 and 1490 $m^2\ g^{-1}$ ($N_2$, Brunauer-Emmett-Teller) for the SPC and the NPC, respectively, with pore volumes of 1.01 $cm^3\ g^{-1}$ and 1.40 $cm^3\ g^{-1}$, respectively. The scanning electron microscopy (SEM) and transmission electron microscopy (TEM) images are shown in FIGS. 2B-D (with scale bar sizes of 100 μm, 500 nm, and 25 nm, respectively), and the X-ray photoelectron spectroscopy (XPS) analyses are shown in FIG. 3.

Example 1.2

$CO_2$ Uptake Measurements

For $CO_2$ uptake measurements, samples were analyzed using volumetric analysis instruments at Rice University and at the National Institute of Standards and Technology (NIST). The measurements were further confirmed with gravimetric measurements.

Figure 4:
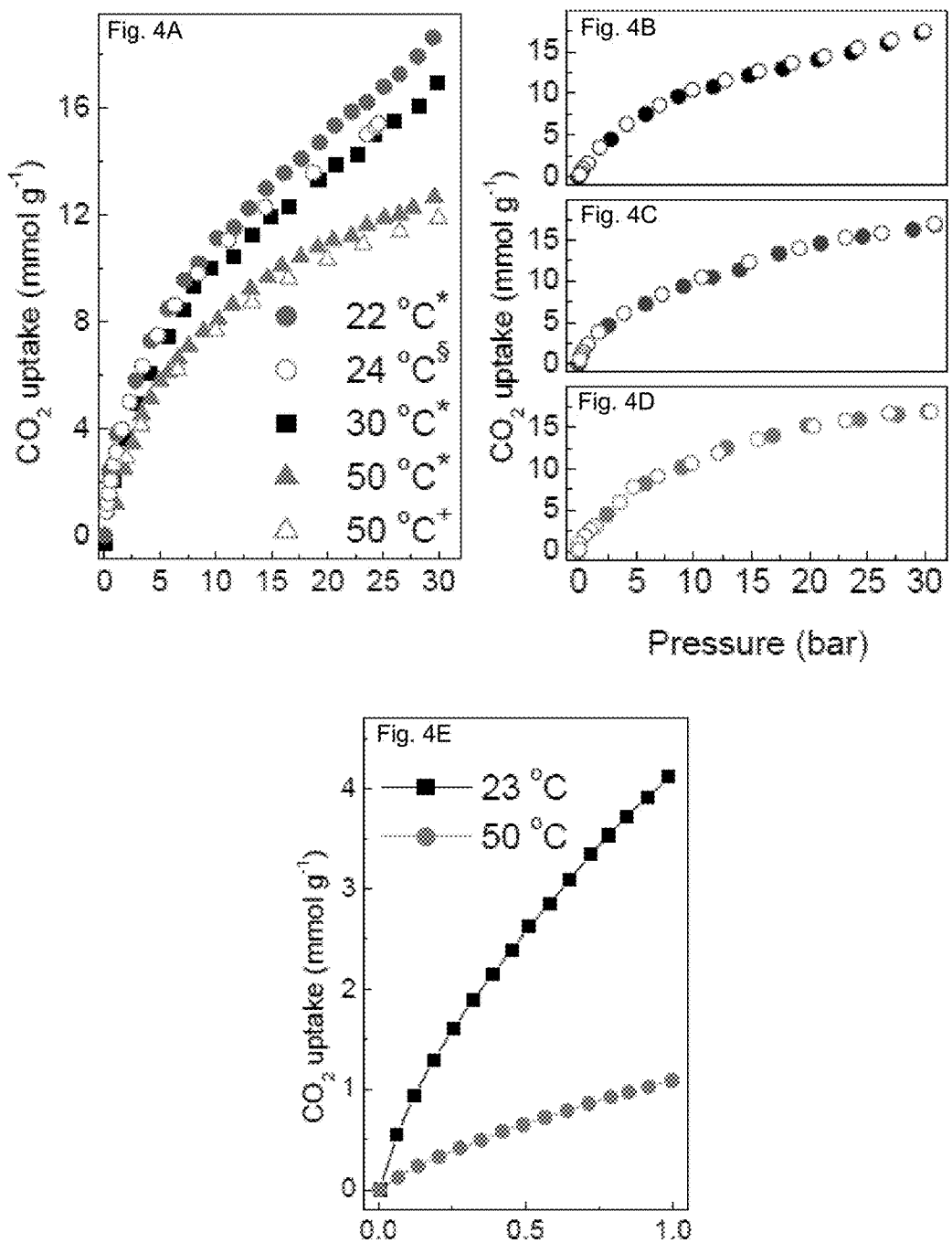
FIG. 4 provides data relating to $CO_2$ uptake measurements for SPCs.

FIG. 4 shows the pressure-dependent $CO_2$ excess uptake for the SPC sorbent at different temperatures peaking at 18.6 mmol $CO_2\ g^{-1}$ of sorbent (82 wt wt %) when at 22° C. and 30 bar. The sorption results measured by volumetric and gravimetric analyses were comparable, as were those measurements on the two volumetric instruments.

Applicants chose 30 bar as the upper pressure limit in experiments because a 300 bar well-head pressure at 10 mol % $CO_2$ concentration would have a $CO_2$ partial pressure of 30 bar. FIGS. 4B-D show three consecutive $CO_2$ sorption-desorption cycles on SPC over a pressure range from 0 to 30 bar, which indicates that the SPC could be regenerated using a pressure swing process while retaining its original $CO_2$ sorption capacity.

In the case of microporous materials with negligible external surface area, total uptake is often used as an approximation for absolute uptake, and the two values here are within 10% of each other. For example, the absolute $CO_2$ uptake of the SPC was 20.1 and 13.9 mmol $g^{-1}$ under 30 bar at 22 and 50° C., respectively. See FIGS. 5-6 and Example 1.8.

Similarly, although absolute adsorption isotherms can be used to determine the heat of sorption, excess adsorption isotherms are more often used to calculate the heat of $CO_2$ sorption ($Q_{CO2}$) before the critical point of the gas. Thus, the excess $CO_2$ sorption isotherms measured at two different temperatures, 23° C. and 50° C. (FIG. 4E), were input into the Clausius-Clapeyron equation. At lower surface coverage (≤1 bar), which could be expected to be more indicative of the sorbate-sorbent interaction, the SPC exhibits a heat of $CO_2$ sorption of 57.8 kJ $mol^{-1}$. Likewise, the maximum $Q_{CO2}$ values for nucleophile-free porous materials, such as activated carbon, Zeolite 5A and zeolitic imidazolate framework (ZIF-8, a class of the MOF) were measured to be 28.4, and 31.2, 25.6 kJ $mol^{-1}$, respectively, at low surface coverage (see Example 1.9). Based on this data, the SPC possesses the highest $CO_2$ sorption enthalpy among these complementary sorbents measured at low surface coverage.

In order to better assess the sorption mechanism during the $CO_2$ uptake, attenuated total reflectance infrared spectroscopy (ATR-IR) was used to characterize the properties of the sorbents before and after the $CO_2$ uptake. A sample vial with ~100 mg of the SPC was loaded into a 0.8 L stainless steel autoclave equipped with a pressure gauge and valves. Before the autoclave was sealed, the chamber was flushed with $CO_2$ (99.99%) to remove residual air, and the system was pressurized to 10 bar (line pressure limitation). The sorbent was therefore isobarically exposed to $CO_2$ in the closed system at 23° C. After 15 min, the system was vented to nitrogen at ambient pressure and the sorbent vial was immediately removed from the chamber and the sorbent underwent ATR-IR and Raman analyses in air.

Figure 7:
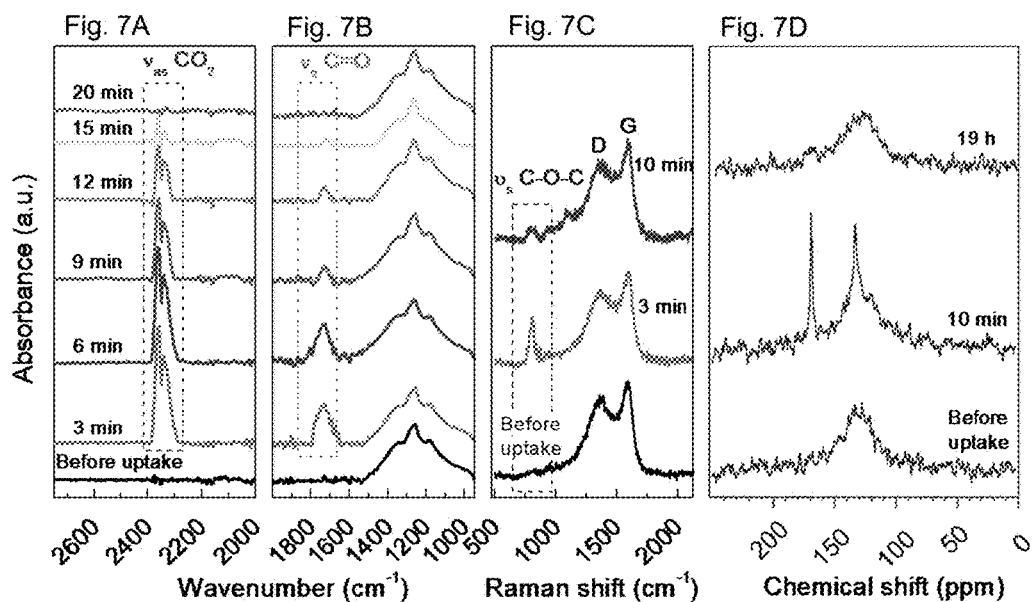
FIG. 7 shows spectral changes before and after sorption-desorption at 23° C. and the proposed polymerization mechanism. Attenuated total reflectance infrared spectroscopy (ATR-IR) (FIGS. 7A-B), Raman spectroscopy (FIG. 7C) and 50.3 MHz $^{13}$C MAS NMR spectra (FIG. 7D) are shown before and after $CO_2$ sorption at 10 bar and room temperature. All spectra were recorded at the elapsed times indicated on the graphs after the SPC sorbent was returned to ambient pressure. In the NMR experiments, the rotor containing the SPC was tightly capped during the analyses. For the third NMR experiment (top), the same material was left under ambient conditions for 19 h before being repacked in the rotor to obtain the final spectrum. Each NMR spectrum took 80 min to record. Example 1 provides more details.
Figure 7:
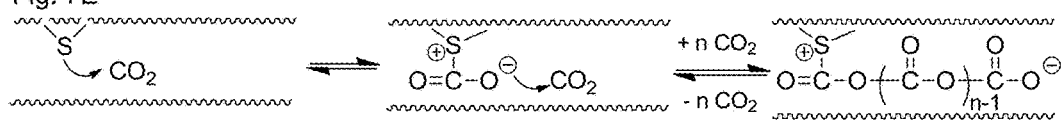
Figure 7:
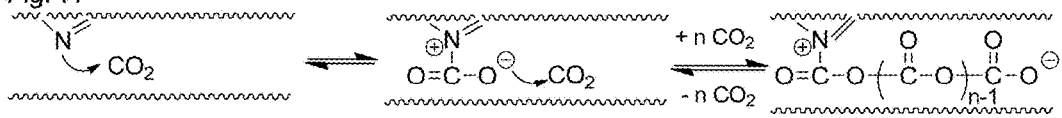
Figure 7:
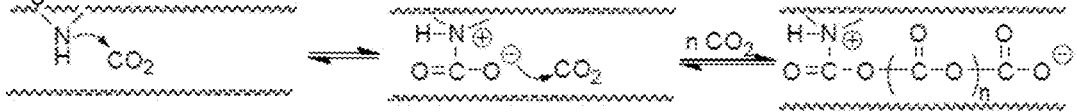
Figures 8, 8A, 8B:
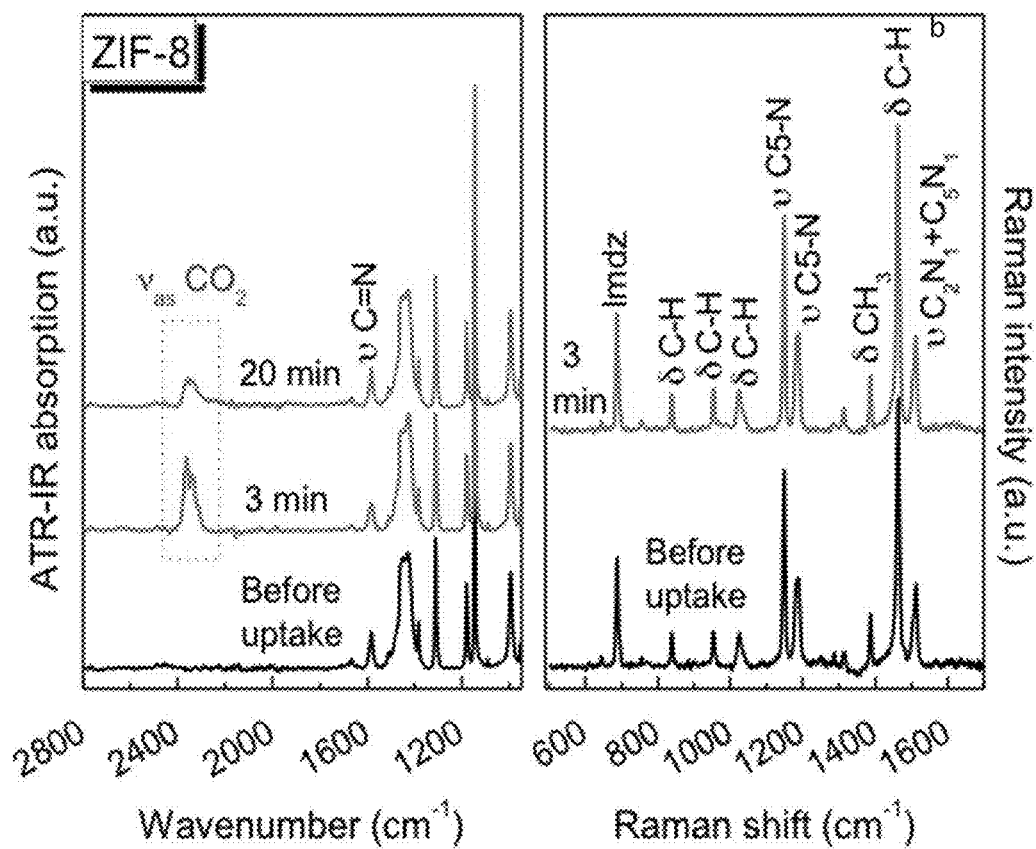
FIG. 8 shows ATR-IR (FIG. 8A) and Raman (FIG. 8B) spectra for the ZIF-8 before and after $CO_2$ sorption at 10 bar. All spectra were recorded 3 and 20 minutes after the ZIF-8 sorbent was returned to ambient pressure at room temperature.
Figures 9, 9A, 9B:
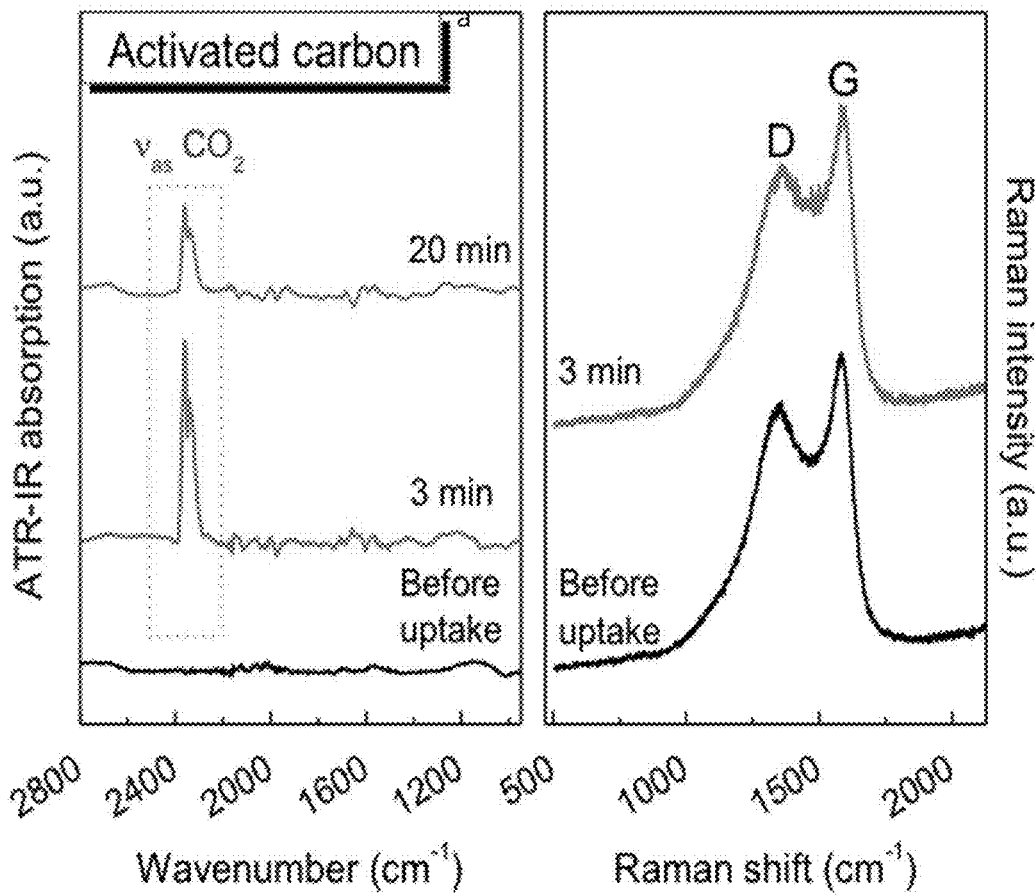
FIG. 9 shows ATR-IR (FIG. 9A) and Raman (FIG. 9B) spectra for the activated carbon before and after $CO_2$ sorption at 10 bar. Spectra were taken 3 min and 20 min after the activated carbon was returned to ambient pressure at room temperature.

FIGS. 7A-B show the ATR-IR spectra of the SPC before (black line) and after exposure to 10 bar of $CO_2$, followed by ambient conditions for the indicated times. The two regions that appear in the ATR-IR spectra (outlined by the dashed-line boxes) after the $CO_2$ sorption are of interest. The first IR peak, located at 2345 $cm^{-1}$, is assigned to the anti-symmetric $CO_2$ stretch, confirming that $CO_2$ was physisorbed and evolving from the SPC sorbent. The other IR band, centered at 1730 $cm^{-1}$, is attributed to the C=O symmetric stretch from the poly($CO_2$) on the SPC. Interestingly, this carbonyl peak is only observed with the porous heteroatom-doped carbon, such as the SPC and NPC. Other porous sorbents without nucleophilic species, such as ZIF-8 and activated carbon, only showed the physisorbed or evolving $CO_2$ peak (~2345 $cm^{-1}$) (FIGS. 8-9). Once the $CO_2$-filled SPC returned to ambient pressure, the key IR peaks attenuated over time and disappeared after 20 min. Based on this data, the ATR-IR study confirmed the poly($CO_2$) formation. Raman spectroscopy was further used to probe individual chemical bond vibrations, as shown in FIG. 7C. The carbonaceous graphitic G-band and defect-derived diamonoid D-band were at 1590 and 1350 $cm^{-1}$. The peak at 798 $cm^{-1}$ can be attributed to the symmetric stretch of the C—O—C bonds, which was not observed for the other nucleophile-free porous materials, suggesting that the poly($CO_2$), with the —(O—C(=O))$_n$— moiety, was formed.

Without being bound by theory, it is envisioned that the monothiocarbonate and carbamate anions within the channels of the SPC and NPC, respectively, were the likely initiation points for the $CO_2$ polymerization since no poly($CO_2$) was seen in activated carbon (FIG. 9). Furthermore, $^{13}C$ NMR also confirms the presence of the poly($CO_2$) formation. The sorbent gives a broad signal characteristic of aromatic carbon (FIG. 7D, bottom).

After exposure to $CO_2$, a relatively sharp signal on top of the broad sorbent signal appears at 130.6 ppm, which can be assigned to the $CO_2$ that is evolving from the support. A sharp signal also appears at 166.5 ppm (FIG. 7D, middle) that is characteristic of the carbonyl resonance for poly($CO_2$). Both of these signals are gone 19 h later (FIG. 7D, top). These assignments are further discussed in detail in Example 1.10.

Compared to secondary amine-based $CO_2$ sorbents where maximum capture efficiency is 0.5 mol $CO_2$ per mol N (2 $RNH_2$+$CO_2$→$RNH_3^+$ $^-O_2CNHR$), the SPC and NPC demonstrate a unique mechanism during the $CO_2$ uptake process resulting in their remarkably higher $CO_2$ capacities versus S or N content (8.1 atomic % of 5 and 6.2 atomic % of N in the SPC and NPC, respectively, by XPS analysis).

FIGS. 7E-G show illustrations of the aforementioned $CO_2$-fixation by polymerization. Dimeric $CO_2$ uptake has been crystallographically observed in metal complexes, and polymeric $CO_2$ has been detected previously but only at extremely high pressures of ~15,000 bar. The spectroscopic determination here confirms poly($CO_2$) formation at much lower pressures than formerly observed.

Figure 10:
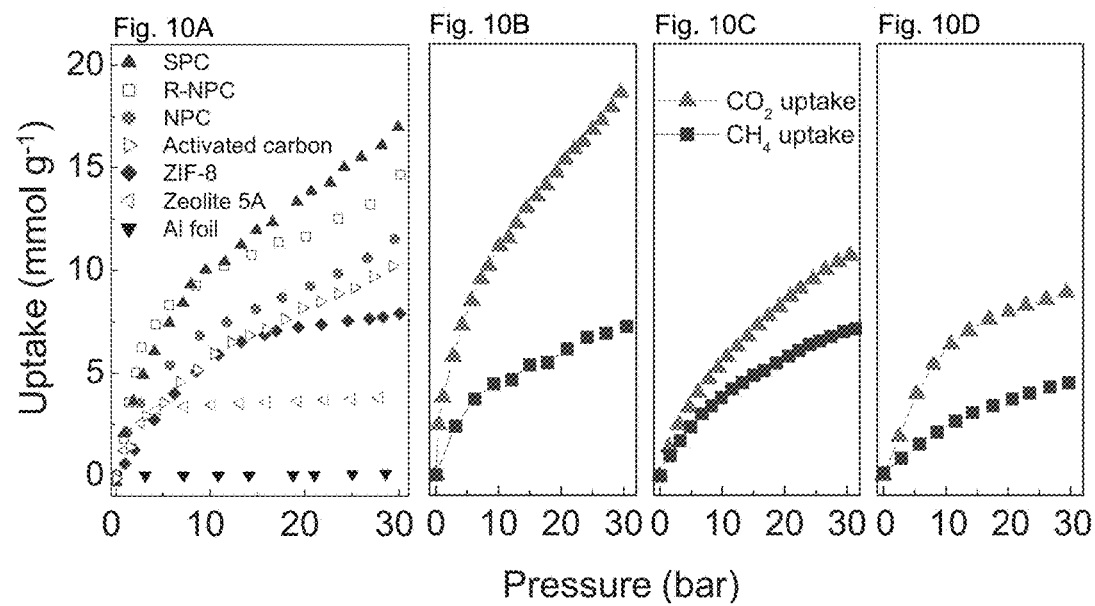
FIG. 10 provides volumetric gas uptake data.

A series of porous materials with and without the nucleophilic heteroatoms were tested to compare their $CO_2$ capture performance up to 30 bar at 30° C. (FIG. 10A). The SPC had the highest $CO_2$ capacity. The NPC, activated carbon, zeolite 5A and ZIF-8 had lower capacities. Although NPC had lower $CO_2$ capacity than SPC, its uptake performance could be improved by 21 wt % after $H_2$ reduction at 600° C., producing reduced-NPC(R-NPC) with secondary amine groups (FIG. 2A).

Even though the surface area of R-NPC (1450 $m^2$ $g^{-1}$) is only slightly greater than that of the activated carbon (1430 $m^2$ $g^{-1}$), the presence of the amine groups induces the formation of the poly($CO_2$) under pressure, promoting the $CO_2$ sorption efficiency of the R-NPC. The pore volume of R-NPC is 1.43 $cm^3$ $g^{-1}$.

Purification of natural gas from wells relies upon a highly $CO_2$-selective sorbent, especially in a $CH_4$-rich environment. Thus, $CH_4$ uptake experiments were carried out on three different types of porous materials, SPC, activated carbon and ZIF-8. FIGS. 10B-D compare $CO_2$ and $CH_4$ sorption over a pressure range from 0 to 30 bar at 23° C. In contrast to the $CO_2$ sorption, the $CH_4$ isotherms for these three sorbents reached equilibrium while the system pressure was approaching 30 bar. The order of the $CH_4$ uptake capacities was correlated to the surface area of the sorbents. Comparing these sorbents, the observed molecular ratio of sorbed $CO_2$ to $CH_4$ ($n_{CO2}/n_{CH4}$) for the SPC (2.6) was greater than that for the activated carbon (1.5) and ZIF-8 (1.9). In addition, the density of the SPC calculated using volumetric analysis is nearly 6-fold higher than in the ZIF-8 (2.21 vs. 0.35 g $cm^{-3}$) and 3-fold higher than the zeolite 5A (2.21 vs. 0.67 g $cm^{-3}$). The high $CO_2$ capacity and high density observed for SPC greatly increase the volume efficiency, which would reduce the volume of the sorption material for a given $CO_2$ uptake production rate.

Figure 11:
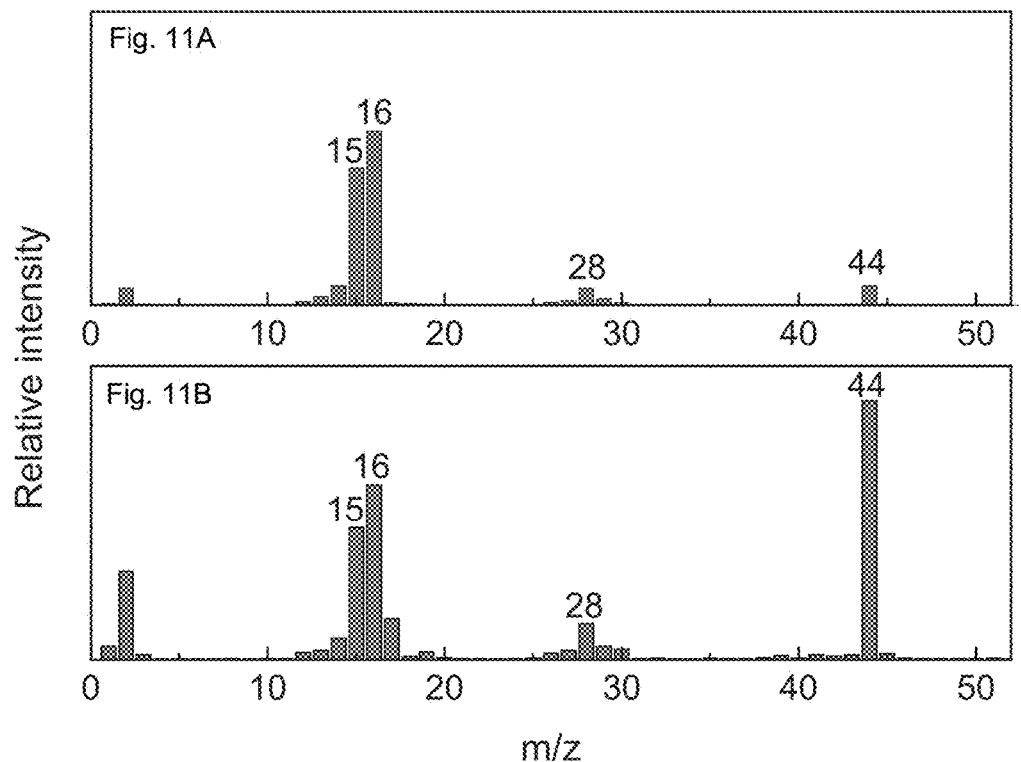
FIG. 11 shows various mass spectrometry (MS) data.

In order to mimic a gas well environment and further characterize the SPC's selectivity to $CO_2$, a premixed gas (85 mol % $CH_4$, 10 mol % $CO_2$, 3 mol % $C_2H_6$ and 2 mol % $C_3H_8$) was used with quadrupole mass spectrometry (MS) detection. The MS inlet was connected to the gas uptake system so that it could monitor the gas effluent from the SPC throughout the sorption-desorption experiment. FIG. 11 shows the mass spectrum recorded during the sorption process. The peaks at 15 and 16 amu correspond to fragment and molecular ions from $CH_4$, while the peaks at 28 and 44 amu are from $CO_2$ in the premixed gas. Other minor peaks can be assigned to fragment ions from $C_2H_6$ and $C_3H_8$. Although the peak at 44 amu can also come from $C_3H_8$ ions, the contribution is negligible because of the lower $C_3H_8$ concentration in the mixed gas, and it is distinguishable by the fragmentation ratios in the MS [$C_3H_8$: m/z=29 (100), 44 (30); $CO_2$: m/z=44(100), 28(11)]. The observed intensity ratio of two peaks at 16 and 44 amu ($I_{16}/I_{44}$=9.1) indicates the abundance of $CH_4$ vs. $CO_2$ during the sorption and also reflects the relative amount of $CH_4$ and $CO_2$ in the premixed gas. Once the sorption reached equilibrium under 30 bar, the desorption process was induced by slowly venting into the MS system. The $I_{16}/I_{44}$ ratio reduced to ~0.7. The SPC has been shown to have 2.6-fold higher $CO_2$ than $CH_4$ affinity at 30 bar when using pure $CO_2$ and $CH_4$ as feed gases (FIG. 10B).

If the binding energy of $CH_4$ and $CO_2$ were assumed to be similar, and the partial pressure of $CH_4$ vs. $CO_2$ in the premixed gas is considered ($P_{CH4}/P_{CO2}$=8.5), then it is envisioned that the number of sorbed $CH_4$ should be ~3.3-times more than that of the sorbed $CO_2$. It is also envisioned that $CO_2$-selective materials have selective sites and once the $CO_2$ occupies those sites, the selectivity significantly decreases and the materials behave as physisorbents with lower selectivities at larger pressures. On the contrary, here the SPC demonstrates much higher $CO_2$ selectivity than expected since the chemisorbed sulfur-initiated poly($CO_2$) chain displaces physisorbed gas.

Under the mechanism described here for $CO_2$ polymerization in the channels of inexpensive nucleophilic porous carbons, these new materials have continuous selectivity toward $CO_2$, limited only by the available pore space and pressure.

Example 1.3

Instrumentations (Rice University)

An automated Sieverts instrument (Setaram PCTPro) was adopted to measure gas ($CO_2$, $CH_4$ or premixed gas) sorption properties of materials. Typically, a ~70 mg of sorbent was packed into a ~1.3 mL of stainless steel sample cell. The sample was pretreated under vacuum (~3 mm Hg) at 130° C. for 6 h and the sample volume was further determined by helium before the uptake experiment. At each step of the measurement, testing gas was expanded from the reference reservoir into the sample cell until the system pressure reached equilibrium. A quadrupole mass spectrometer (Setaram RGA200) was connected to the Sieverts instrument so that it could monitor the gas effluent from the sorbent throughout the entire sorption-desorption experiment. With the assistance of a hybrid turbomolecular drag pump, the background pressure of the MS can be controlled lower than $5 \times 10^{-8}$ Torr. All material densities were determined using volumetric analysis on this same instrument.

XPS was performed using a PHI Quantera SXM Scanning X-ray Microprobe with a base pressure of $5 \times 10^{-9}$ Torr. Survey spectra were recorded in 0.5 eV step size and a pass energy of 140 eV. Elemental spectra were recorded in 0.1 eV step size and a pass energy of 26 eV. All spectra were standardized using C1s peak (284.5 eV) as a reference.

The ATR-IR experiment was conducted using a Fourier transform infrared spectrometer (Nicolet Nexus 670) equipped with an attenuated total reflectance system (Nicolet, Smart Golden Gate) and a MCT-A detector. Raman spectra were measured using a Renishaw in Via Raman Microscope with a 514 nm excitation argon laser.

Scanning electron microscope (SEM) images were taken at 15 KeV using a JEOL-6500F field emission microscope. High-resolution transmission electron microscope (TEM) images were obtained with a JEOL 2100F field emission gun TEM.

An automated BET surface analyzer (Quantachrome Autosorb-3b) was used for measurements of sorbents' surface areas and pore volumes based on $N_2$ adsorption-desorption. Typically, a ~100 mg of sample was loaded into a quartz tube and pretreated at 130° C. under vacuum (~5 mm Hg) in order to remove sorbates before the measurement.

MAS NMR spectra were recorded on a Bruker Avance III 4.7 T spectrometer with a standard MAS probe for 4 mm outer diameter rotors.

Example 1.4

Volumetric CO$_2$ Sorption Experiments (NIST)

CO$_2$ sorption measurements were carried out on computer-controlled custom-built volumetric sorption equipment previously described in detail (*J. Phys. Chem. C* 111, 16131-16137 (2007)) with an estimated reproducibility within 0.5% and isotherm data error bar of less than 2% compared to other commercial instruments. An amount of ~79 mg of sample was used for the experiments. Sample degassing, prior to the CO$_2$ sorption experiment, was done at 130° C. under vacuum for 12 h.

Example 1.5

Gravimetric CO$_2$ Sorption Experiments

CO$_2$ sorption measurements were performed on a high pressure thermal gravimetric equipment (Model: TGA-HP50) from TA Instruments. An amount of ~15 mg of sample was used for the experiments. Sample degassing, prior to CO$_2$ sorption experiment, was done at 130° C. under vacuum for 12 h.

Example 1.6

Synthesis of S-Containing Porous Carbon (SPC)

Poly[(2-hydroxymethyl)thiophene] (PTh) (Sigma-Aldrich) was prepared using FeCl$_3$. *Microporous Mesoporous Mater.* 158, 318-323 (2012). In a typical synthesis, 2-thiophenemethanol (1.5 g, 13.1 mmol) in CH$_3$CN (10 mL) was slowly added under vigorous stirring to a slurry of FeCl$_3$ (14.5 g, 89.4 mmol) in CH$_3$CN (50 mL). The mixture was stirred at room temperature for 24 h. The polymer (PTh) was separated by filtration over a sintered glass funnel, washed with distilled water (~1 L) and then with acetone (~200 mL). The polymer was dried at 100° C. for 12 h to afford (1.21 g, 96% yield) of the desired compound.

The PTh was activated by grinding PTh (500 mg) with KOH (1 g, 17.8 mmol) with a mortar and pestle and then heated under Ar at 600° C. in a tube furnace for 1 h. The Ar flow rate was 500 sccm. After cooling, the activated sample was thoroughly washed 3× with 1.2 M HCl (1 L) and then with distilled water until the filtrate was pH 7. The SPC sample was dried in an oven at 100° C. to afford 240 mg of the black solid SPC. The BET surface area and pore volume were 2500 m$^2$ g$^{-1}$ and 1.01 cm$^3$ g$^{-1}$, respectively.

Example 1.7

Synthesis of N-Containing Porous Carbon (NPC)

Commercial polyacrylonitrile (PAN, 500 mg, average M$_w$ 150,000, Sigma-Aldrich) powder and KOH (1500 mg, 26.8 mmol) were ground to a homogeneous mixture in a mortar. The mixture was subsequently carbonized by heating to 600° C. under Ar (500 sccm) in a tube furnace for 1 h. The carbonized material was washed 3× with 1.2 M HCl (1 L) and then with distilled water until the filtrate was pH 7. Finally, the carbon sample was dried in an oven at 100° C. to afford 340 mg of the solid black NPC.

To produce R-NPC, the activated material (270 mg) was further reduced by 10% H$_2$ (H$_2$:Ar=50:450 sccm) at 600° C. for 1 h to provide 255 mg of the final material. The BET surface area and pore volume were 1450 m$^2$ g$^{-1}$ and 1.43 cm$^3$ g$^{-1}$, respectively.

Example 1.8

Conversion of Excess Uptake to Absolute Uptake

Figure 5:
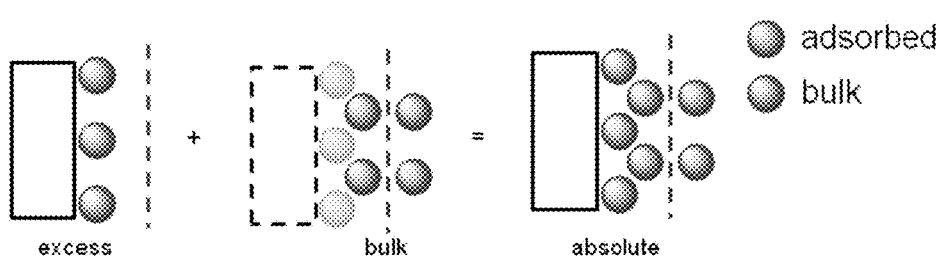
FIG. 5 provides pictorial descriptions of excess and absolute $CO_2$ uptake.
Figure 5:
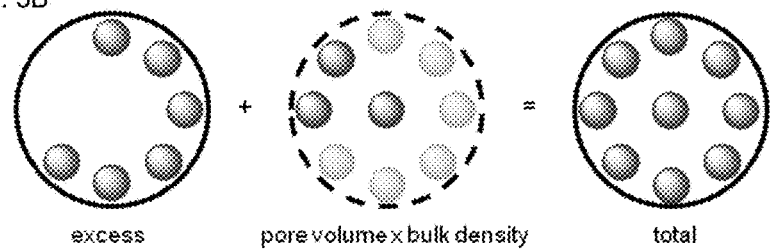
Figure 6:
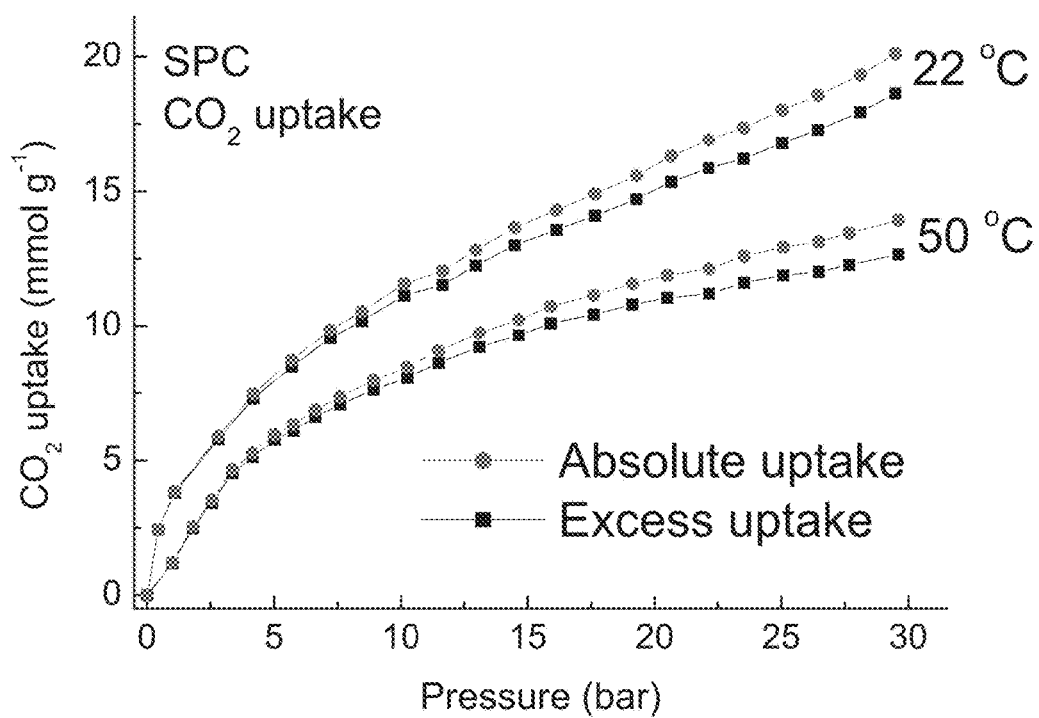
FIG. 6 shows $CO_2$ uptake on the SPC. Comparison of absolute uptake and excess uptake at 22° C. and 50° C. exemplifies the small differences over this pressure and temperature range.

Total uptake includes all gas molecules in the adsorbed state, which is the sum of the experimentally measured excess uptake and the bulk gas molecules within the pore volume (FIG. 5). For microporous materials with negligible external surface area, the total uptake is often used as an approximation for absolute uptake and could be represented in the following equation:

$$N_{total} \approx N_{abs.} = N_{ex.} + V_p \cdot \rho_{bulk}(P,T)$$

In the above equation, $V_p$ is the pore volume of porous material and $\rho_{bulk}$ is the density of gas in the bulk phase at given pressure and temperature. In the case of SPC, the pore volume was determined to be 1.01 cm$^3$ g$^{-1}$ by N$_2$ adsorption isotherm at 77K (BET analysis). The CO$_2$ density changes from 0.00180 to 0.06537 g cm$^{-3}$ in the pressure range between 1 and 30 bar at 22° C. and 0.00164 to 0.05603 g cm$^{-3}$ at 50° C.

Example 1.9

Determination of the Heat of CO$_2$ Sorption (Q)

The Clausius-Clapeyron equation (*Adsorption* 175, 133-137 (1995)) was used to determine the heat of CO$_2$ sorption:

$$\left(\frac{\partial \ln P}{\partial T}\right)_\theta = \frac{Q}{RT^2}$$

In the above equation, $\theta$ is the fraction of the adsorbed sites at a pressure P and temperature T, and R is the universal constant. The equation can be further derived as the following expression for transitions between a gas and a condense phase:

$$\ln P_2 - \ln P_1 = \frac{Q}{R}\left(\frac{1}{T_1} - \frac{1}{T_2}\right)$$

Table 1 below compares the heat of CO$_2$ sorption to values in the literature.

TABLE 1

Heat of CO$_2$ sorption determined in Example 1 versus literature values.

|  | $Q_{CO2}$ (kJ mol$^{-1}$) | Comparison with reference |
|---|---|---|
| SPC | 57.8 | 59.0[1] |
| Activated carbon | 28.4 | 28.9[2] |
| Zeolite 5A | 31.2 | 33.7[3] |
| ZIF-8 | 25.6 | 27.0[4] |

Ref. [1]*Carbon* 50, 5543-5553 (2012).
Ref. [2]*J. Natural Gas Chem.* 15, 223-229 (2006).
Ref. [3]*Handbook of Zeolite Science and Technology*, Marcel Dekker, Inc. New York (2003).
Ref. [4]*AIChE J.* 59, 2195-2206 (2013).

Example 1.10

Evaluation of the $^{13}C$ NMR Assignments

The three NMR spectra in FIG. 7D were obtained under identical conditions: 12 kHz MAS, 2.5-μs 90° $^{13}C$ pulse, 41-ms FID, 10-s relaxation delay; 480 scans; and 50 Hz of line broadening applied to the FID.

Numerous MAS NMR investigations of $CO_2$ have reported a signal at 125±1 ppm, regardless of the physical environment for the $CO_2$ (e.g., free gas, physisorbed on various materials, in a metal organic framework, in a clathrate, dissolved in a glass, etc.) Accordingly, attributing the signal at 130.6 ppm to $CO_2$ physisorbed on the sorbent seems reasonable, although the reason for the additional deshielding may not be apparent. It is envisioned that this 5-ppm difference does not result from the use of different chemical shift references, as the various reports indicate that either the signal from $Si(CH_3)_4$ (TMS) serves as the chemical shift reference (0 ppm) or that the signal from a solid such as adamantane or glycine (this work) relative to TMS at 0 ppm serves as the chemical shift reference. Applicants note that the sorbent is somewhat conductive in that it has a noticeable effect on the tuning and matching of the $^{13}C$ and $^{1}H$ channels of the NMR probe (relative to the tuning and matching for glycine). However, spinning is unaffected. Without being bound by theory, it is envisioned that the conductive nature of the sorbent results in the 5-ppm deshielding effect observed for physisorbed $CO_2$.

A chemical shift of 166.5 ppm is rational for poly($CO_2$) in light of various reports of bicarbonate and carbonate species giving signals from 162 to 170 ppm relative to TMS or to $[(CH_3)_3Si]_4Si$, which is 3.5 ppm relative to TMS at 0 ppm. The carbonyl chemical shift of $CH_3O$—$CO$—$O$—$CO$—$OCH_3$ is extremely sensitive to its environment (the reported shift is 147.9 ppm as a neat liquid at 37° C. and 157 ppm in $CDCl_3$, both relative to TMS). Applicants are not aware of any reports of chemical shift data for poly($CO_2$) and are hereby reporting the first such example of that chemical shift at 166.5 ppm when entrapped in this carbon matrix.

Example 2

$CO_2$ Sorption Capacities of Different Carbon Materials

In this example, the $CO_2$ uptake capacities of SPC, R-NPC, rice protein, ZIF-8 and Zeolite 5A were compared. The $CO_2$ uptake measurements were conducted at 30° C. and 30 bar.

Figure 12:
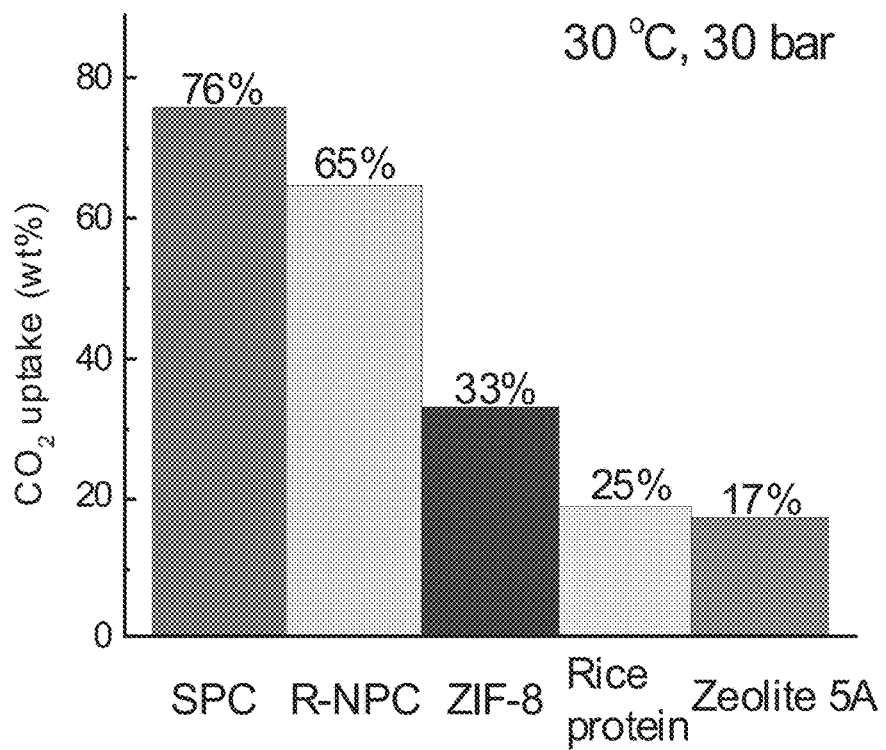
FIG. 12 provides comparative data relating to the $CO_2$ uptake capacities of various carbon sources.

As shown in FIG. 12, the $CO_2$ uptake capacities of SPC and R-NPC were significantly higher than the $CO_2$ uptake capacities of ZIF-8, rice protein, and Zeolite 5A.

Example 3

$CO_2$ and $H_2S$ Capture by Porous Carbon Materials

Figure 13A:
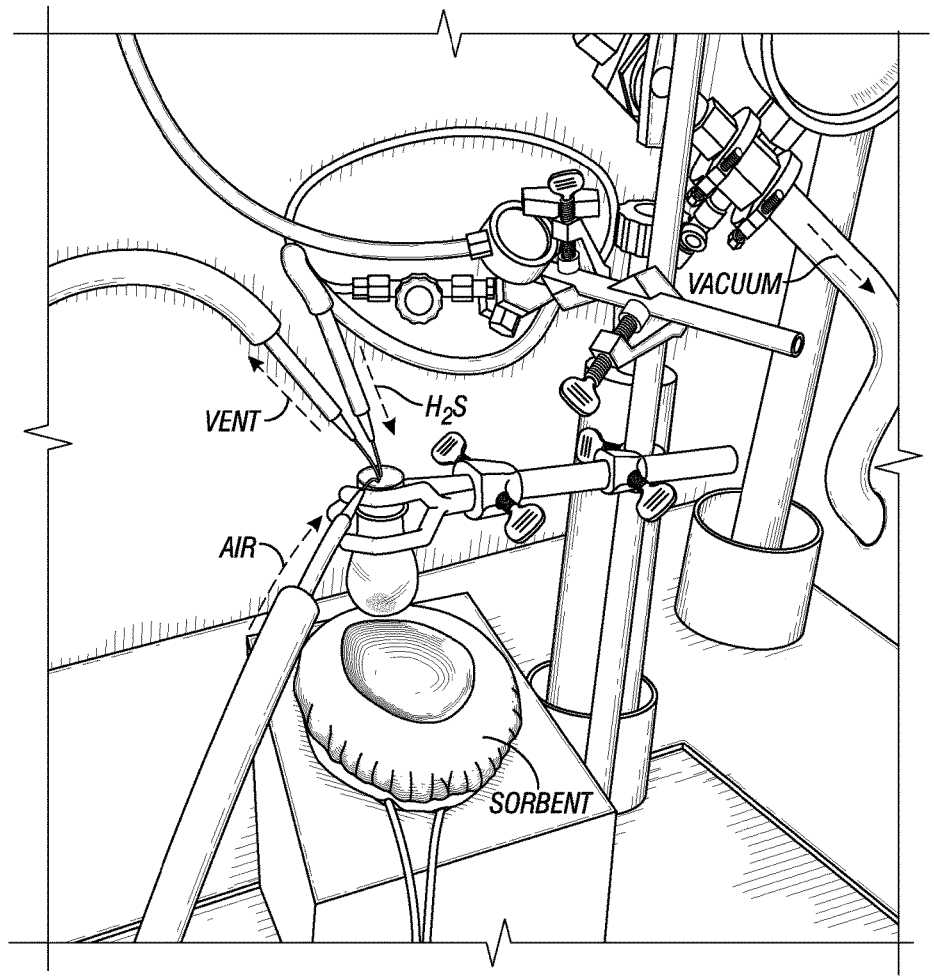
FIG. 13A shows an image of an apparatus utilized for $H_2S$ capture.
Figure 13B:
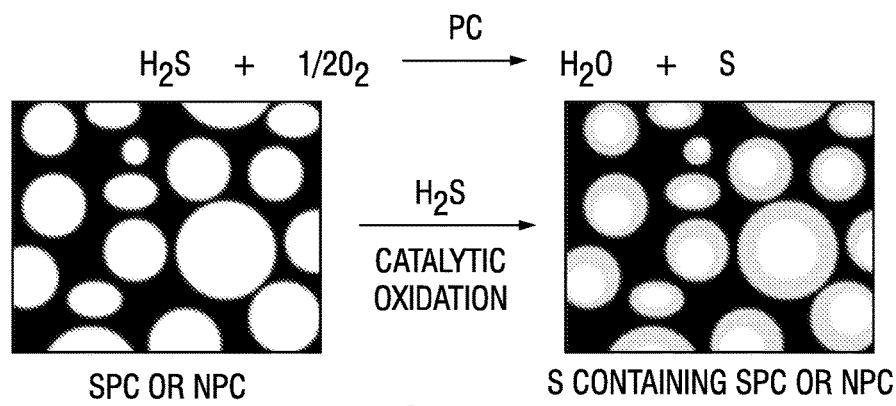
FIG. 13B shows a scheme of $H_2S$ capture by SPCs and NPCs.

This Example pertains to the use of SPCs and NPCs for the capture of both $CO_2$ and $H_2S$. The apparatus illustrated in FIG. 13A was utilized to measure $H_2S$ capture by NPCs and SPCs. Before $H_2S$ capture, the sorbent (i.e., SPC or NPC) was dried at 120° C. for 1 hour under vacuum (0.05 Torr). Next, the sorbent was treated with $H_2S$ under air flow for 1 hour. An $H_2S$ capture scheme for this experiment is illustrated in FIG. 13B.

Figure 14:
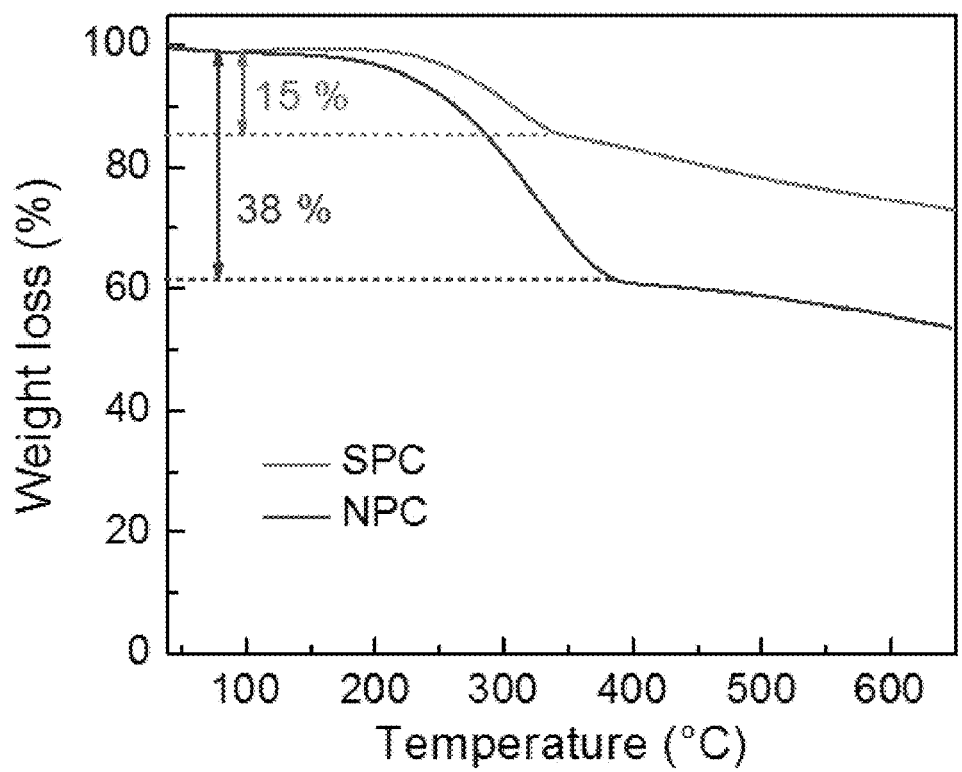
FIG. 14 shows thermogravimetric analysis (TGA) curves of SPCs and NPCs after $H_2S$ uptake.

The amount of $H_2S$ uptake by NPCs and SPCs, both after oxidation to sulfur, was measured by thermogravimetric analysis (TGA). The TGA curve of SPCs and NPCs after $H_2S$ uptake and oxidation is shown in FIG. 14. The $H_2S$ uptake of SPCs and NPCs are 18 wt % and 61 wt %, respectively.

The $CO_2$ uptake capacities of the NPCs and SPCs were also measured by the methods described in Example 1.2. The results are summarized in Table 2.

TABLE 2

The properties and gas uptake capacities of SPCs and NPCs. The $H_2S$ uptake capacities, after oxidation to sulfur, of the porous carbon materials were measured as a function of the amount of sulfur retained on the porous carbon material.

| Sample | Textural properties SBET ($m^2/g$) | Chemical Composition (atomic %) | | | | $H_2S$ Uptake Capacity (g/g) | $CO_2$ Uptake Capacity at 30 bar (g/g) |
| --- | --- | --- | --- | --- | --- | --- | --- |
| | | N | C | O | S | | |
| SPC | 2500 | — | 90.7 | 6.2 | 2.1 | 0.18 | 0.84 |
| NPC | 1450 | 2.4 | 92.4 | 5.1 | — | 0.61 | 0.62 |

Without being bound by theory, it is envisioned that, as a result of the basic functional groups on the surfaces of NPCs and SPCs, the porous carbon materials of the present disclosure can capture $H_2S$ by an acid-base reaction, where an amine group on the porous carbon abstracts a proton from $H_2S$ to yield the ammonium salts and hydrogen monosulfide anions according to the following scheme:

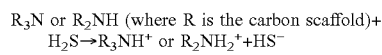

$R_3N$ or $R_2NH$ (where R is the carbon scaffold)+
$H_2S \rightarrow R_3NH^+$ or $R_2NH_2^+ + HS^-$ In this scheme, the equilibrium constant ($k_{eq}$) is ~1000 based on the pka values of the starting materials ($H_2S$) and products (ammonium species). The hydrogen sulfide can evolve upon heating. As a result of the reaction of $HS^-$ ions with $O_2$ from air introduced in the carbon support, the captured $H_2S$ produces sulfur products such as S, $SO_2$ and $H_2SO_4$. As illustrated in FIG. 13B, it is also envisioned that the catalytic oxidation of $H_2S$ on SPCs and NPCs can proceed at room temperature by air oxidation.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of capturing a gas from an environment, wherein the method comprises:
   associating the environment with a porous carbon material,
   wherein the porous carbon material comprises a plurality of pores and a plurality of nucleophilic moieties embedded within the plurality of the pores, wherein the associating results in sorption of gas components to the porous carbon material,
and wherein the gas components comprise $H_2S$.

2. The method of claim 1, wherein the environment is selected from the group consisting of industrial gas streams, natural gas streams, natural gas wells, industrial gas wells, oil and gas fields, and combinations thereof.

3. The method of claim 1, wherein the environment is a pressurized environment.

4. The method of claim 3, wherein the environment has a total pressure higher than atmospheric pressure.

5. The method of claim 3, wherein the environment has a total pressure of about 5 bar to about 500 bar.

6. The method of claim 1, wherein the associating occurs by placing the porous carbon material at or near the environment.

7. The method of claim 1, wherein the associating occurs by flowing the environment through a structure that contains the porous carbon materials.

8. The method of claim 1, wherein the sorption of the gas components to the porous carbon material occurs by at least one of absorption, adsorption, ionic interactions, physisorption, chemisorption, covalent bonding, non-covalent bonding, hydrogen bonding, van der Waals interactions, acid-base interactions, and combinations thereof.

9. The method of claim 1, wherein the sorption of the gas components to the porous carbon material occurs above atmospheric pressure.

10. The method of claim 1, wherein the sorption of the gas components to the porous carbon material occurs at total pressures ranging from about 5 bar to about 500 bar.

11. The method of claim 1, wherein the $H_2S$ is converted within the pores of the porous carbon materials to at least one of elemental sulfur (S), sulfur dioxide ($SO_2$), sulfuric acid ($H_2SO_4$), and combinations thereof.

12. The method of claim 1, wherein the porous carbon material has a $H_2S$ sorption capacity of about 10 wt % to about 100 wt % of the porous carbon material weight.

13. The method of claim 1, wherein the sorption of $H_2S$ to the porous carbon material results in conversion of $H_2S$ to elemental sulfur, and wherein the formed elemental sulfur becomes impregnated with the porous carbon material.

14. The method of claim 1, further comprising a step of releasing captured gas components from the porous carbon material.

15. The method of claim 14, wherein the releasing occurs by decreasing the pressure of the environment.

16. The method of claim 14, wherein the releasing occurs by placing the porous carbon material in a second environment, wherein the second environment has a lower pressure than the environment where gas capture occurred.

17. The method of claim 14, wherein the releasing occurs at or below atmospheric pressure.

18. The method of claim 14, wherein the releasing occurs at the same temperature at which gas sorption occurred.

19. The method of claim 14, wherein the releasing occurs without heating the porous carbon material.

20. The method of claim 14, wherein the releasing occurs by heating the porous carbon material.

21. The method of claim 1, wherein the releasing of the $H_2S$ occurs by heating the porous carbon material.

22. The method of claim 14, further comprising a step of disposing the released gas components.

23. The method of claim 14, further comprising a step of reusing the porous carbon material after the releasing step to capture additional gas components from an environment.

24. The method of claim 1, wherein the porous carbon material is selected from the group consisting of nucleophilic polymers, polypeptides, proteins, waste materials, carbohydrates, cotton, fat, nitrogen-containing porous carbon materials, sulfur-containing porous carbon materials, metal-containing porous carbon materials, metal-oxide containing porous carbon materials, metal sulfide-containing porous carbon materials, phosphorous containing porous carbon materials, and combinations thereof.

25. The method of claim 1, wherein the porous carbon material comprises a nucleophilic polymer.

26. The method of claim 25, wherein the nucleophilic polymer is selected from the group consisting of nitrogen-containing polymers, sulfur-containing polymers, polythiophene (PTH), polythiophene-methanol (2-(hydroxymethyl) thiophene), polyacrylonitrile (PAN), polypyrrole, and combinations thereof.

27. The method of claim 25, wherein the nucleophilic polymer is reduced.

28. The method of claim 1, wherein the nucleophilic moieties are selected from the group consisting of primary nucleophiles, secondary nucleophiles, tertiary nucleophiles and combinations thereof.

29. The method of claim 1, wherein the nucleophilic moieties are selected from the group consisting of oxygen-containing moieties, sulfur-containing moieties, metal-containing moieties, metal oxide-containing moieties, metal sulfide-containing moieties, nitrogen-containing moieties, phosphorous-containing moieties, and combinations thereof.

30. The method of claim 1, wherein the nucleophilic moieties comprise nitrogen-containing moieties.

31. The method of claim 30, wherein the nitrogen-containing moieties are selected from the group consisting of primary amines, secondary amines, tertiary amines, nitrogen oxides, and combinations thereof.

32. The method of claim 1, wherein the porous carbon material has surface areas ranging from about 1,000 $m^2/g$ to about 3,000 $m^2/g$.

33. The method of claim 1, wherein the plurality of pores in the porous carbon material comprise diameters ranging from about 5 nm to about 100 nm.

34. The method of claim 1, wherein the plurality of pores in the porous carbon material comprise volumes ranging from about 1 $cm^3/g$ to about 10 $cm^3/g$.

35. The method of claim 1, wherein the porous carbon material has a density ranging from about 0.3 $g/cm^3$ to about 4 $g/cm^3$.

36. The method of claim 1, wherein the porous carbon material comprises a nucleophilic polymer, and wherein the plurality of nucleophilic moieties comprise nitrogen-containing moieties.

37. The method of claim 36, wherein the nucleophilic polymer is carbonized.

38. The method of claim 36, wherein the nucleophilic polymer is carbonized and reduced.

39. The method of claim 1, wherein the porous carbon material has a $H_2S$ sorption capacity of at least about 60 wt %.

40. The method of claim 1, wherein the porous carbon material has a $H_2S$ sorption capacity of at least about 200 wt %.

41. The method of claim 1, wherein the plurality of pores in the porous carbon material comprise diameters of more than 50 nm.

42. The method of claim 1, wherein the porous carbon material has a surface area of more than about 1,500 $m^2/g$.

* * * * *